United States Patent
Rupp et al.

(10) Patent No.: US 9,413,166 B2
(45) Date of Patent: Aug. 9, 2016

(54) NOISE-TOLERANT ACTIVE CLAMP WITH ESD PROTECTION CAPABILITY IN POWER UP MODE

(71) Applicant: Infineon Technologies AG, Neubiberg (DE)

(72) Inventors: Andreas Rupp, Unterhaching (DE); Yiqun Cao, München (DE); Ulrich Glaser, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 242 days.

(21) Appl. No.: 14/162,410

(22) Filed: Jan. 23, 2014

(65) Prior Publication Data
US 2015/0207313 A1  Jul. 23, 2015

(51) Int. Cl.
*H02H 9/04* (2006.01)
(52) U.S. Cl.
CPC ........................... *H02H 9/04* (2013.01)
(58) Field of Classification Search
CPC ........................................... H02H 9/04
USPC ................................................ 361/56
See application file for complete search history.

(56) References Cited

U.S. PATENT DOCUMENTS

| | | | |
|---|---|---|---|
| 5,671,111 A | 9/1997 | Chen | |
| 7,692,905 B2 | 4/2010 | Hung | |
| 7,894,170 B2 | 2/2011 | Liao et al. | |
| 2007/0247772 A1* | 10/2007 | Keppens | H01L 27/0266 361/56 |
| 2008/0239599 A1* | 10/2008 | Yizraeli | H02H 9/046 361/56 |
| 2012/0080716 A1 | 4/2012 | Ker et al. | |
| 2012/0162833 A1* | 6/2012 | Russ | H02H 9/046 361/56 |
| 2012/0236445 A1 | 9/2012 | Ker et al. | |
| 2012/0236447 A1 | 9/2012 | Mack et al. | |
| 2012/0236448 A1 | 9/2012 | Hiraoka | |

* cited by examiner

*Primary Examiner* — Thienvu Tran
*Assistant Examiner* — Kevin J Comber
(74) *Attorney, Agent, or Firm* — Shumaker & Sieffert, P.A.

(57) ABSTRACT

A circuit is described comprising electrostatic discharge (ESD) protection circuitry, keep-off circuitry and ESD detection circuitry. When the ESD detection circuitry detects an ESD event, the ESD detection circuitry is configured to both enable the ESD protection circuitry and disable the keep-off circuitry.

17 Claims, 13 Drawing Sheets

NOISE-TOLERANT ACTIVE CLAMP WITH ESD PROTECTION CAPABILITY IN POWER UP MODE

TECHNICAL FIELD

This disclosure relates to electronics and, more particularly, relates to electrostatic discharge protection circuitry utilizing active clamps.

BACKGROUND

An imbalance of electric charges within or on the surface of a material creates static electricity. This charge imbalance is most commonly observed as resulting from what is known as the triboelectric effect, also referred to as triboelectric charging. Tribolectric charging causes materials with weakly bound electrons to lose electrons through friction to materials with sparsely filled outer shells, resulting in one material becoming positively charged and the other negatively charged. Electrostatic discharge (ESD) is the sudden flow of electricity between two objects caused by contact. In everyday life, a common example of triboelectric charging occurs when someone walks across a floor creating a buildup of static electricity, and a common example of ESD occurs when that person touches a light switch or other conductive material, sometimes resulting in a small spark.

The spark created in the example above is typically harmless, and sometimes even imperceptible, to human beings but can potentially be very damaging to electronic devices and components. The example above of a person walking across a floor and touching a conductive material is just one of many examples of how static electricity can buildup and result in ESD. To prevent damage caused by ESD, electronics manufacturers often include ESD protection circuitry in electronic devices and components such as integrated circuits (ICs) and printed circuit boards (PCBs). An IC with a ground pin and cascaded voltage pins (i.e. pins with different supply voltages), for example, may include ESD protection circuitry to protect the functional circuits between the various pin combinations from both positive and negative ESD stresses. One type of ESD protection circuitry commonly used in electronic devices is an ESD clamp. Upon detecting a voltage event across two pins (e.g., an overvoltage or voltage spike that exceeds a threshold) caused for example by an ESD event, the ESD clamp directs current caused by the voltage event away from functional circuitry, for example to a ground.

ESD protection circuitry adds to overall circuit complexity and requires physical space on the circuit but may be necessary in some cases to protect the functional circuitry of the circuit. Without ESD protection circuitry, circuit reliability is potentially reduced, and the need for time consuming and costly circuit replacement is potentially increased. ESD protection circuitry may influence electromagnetic capability (EMC) performance. Since ESD protection circuitry may not only respond to an ESD event, but to any kind of disturbance of the line connected to the protected pad, the overall EMC performance may be drastically reduced.

SUMMARY

In general, techniques and circuits are described for protecting a circuit from electrostatic discharge (ESD) events and whether the circuit is powered on or powered off. A circuit as described herein may include functional circuitry and active clamp circuitry. The active clamp circuitry may comprise ESD protection circuitry, keep-off circuitry, keep-off control circuitry and ESD detection circuitry. While the circuit is operating in a powered off or non-powered state, ESD protection circuitry of the active clamp circuitry may be normally enabled to protect functional circuitry of the circuit from ESD events.

While the circuit is operating in a powered on state, the ESD protection circuitry may be normally disabled and the keep-off circuitry of the active clamp circuitry may be normally enabled. While the circuit is operating in a powered on state, the ESD detection circuitry may be configured to detect a voltage event (e.g., an overvoltage or voltage spike that exceeds a threshold) at an input to the functional circuitry of the circuit and determine whether the detected voltage event represents an ESD event. For example, the ESD detection circuitry may determine that the voltage event represents an ESD event based on amplitude (e.g., voltage level) of the voltage associated with the voltage event and/or frequency associated with the voltage event. When the ESD detection circuitry detects an ESD event, the ESD detection circuitry may disable the keep-off circuitry and enable the ESD protection circuitry. In this way, the described techniques and circuits may provide active clamping circuitry with keep-off behavior in normal operation while also providing ESD protection capability.

In one example, the disclosure is directed to a circuit comprising electrostatic discharge (ESD) protection circuitry, keep-off circuitry, and ESD detection circuitry. The ESD detection circuitry is configured to enable the ESD protection circuitry and disable the keep-off circuitry when the ESD detection circuitry detects an ESD event.

In another example, the disclosure is directed to a method comprising detecting, by an electrostatic discharge (ESD) detection circuitry of a circuit, a voltage event at an input of the circuit, and determining, by the ESD detection circuitry, whether the voltage event at the input is indicative of an ESD event. The method further includes responsive to determining that the voltage event is indicative of an ESD event: disabling, by the ESD detection circuitry of the circuit, keep-off circuitry of the circuit, and enabling, by the ESD detection circuitry of the circuit and by means of keep-off-control circuitry of the circuit, ESD protection circuitry of the circuit.

In another example, the disclosure is directed to a system comprising means for detecting a voltage event at an input of the circuit, and means for determining whether the voltage event at the input is indicative of an ESD event. The system further comprises means for disabling keep-off circuitry of the circuit in response to determining that the voltage event is indicative of the ESD event, and means for enabling ESD protection circuitry of the circuit in response to determining that the voltage event is indicative of the ESD event.

The details of one or more examples are set forth in the accompanying drawings and the description below. Other features, objects, and advantages will be apparent from the description and drawings, and from the claims.

DESCRIPTION

Figure 1A:
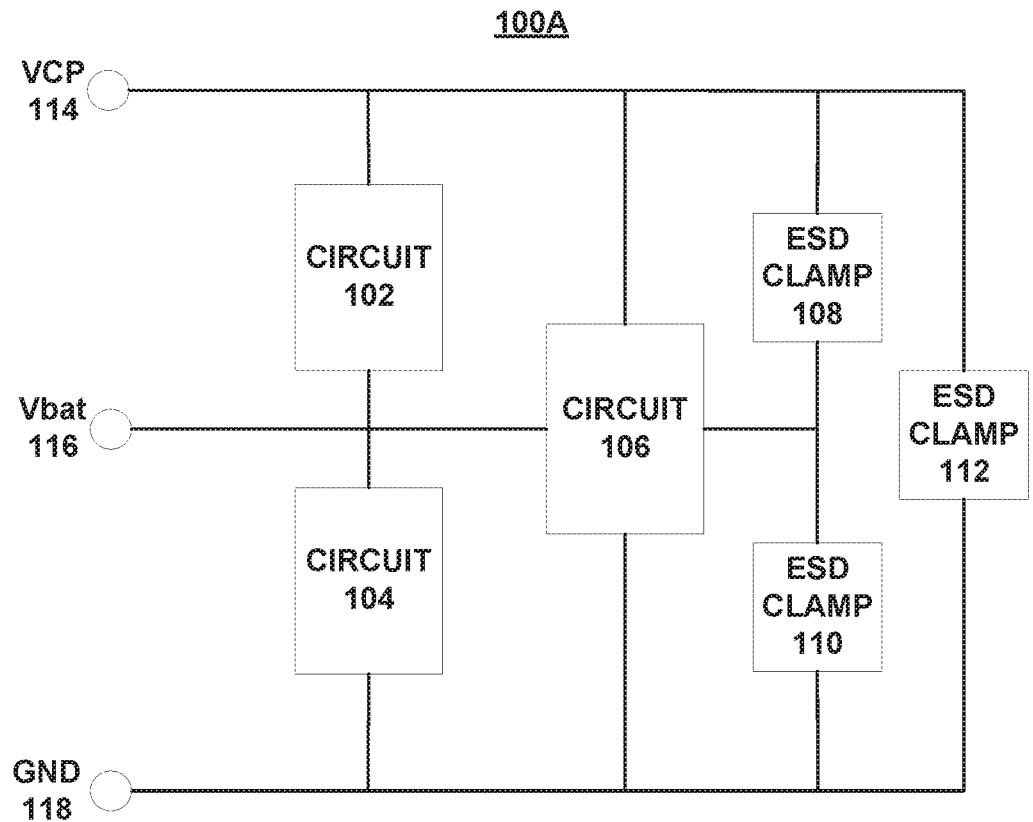
FIG. 1A shows a schematic view of a prior art ESD concept using different ESD clamps to protect different circuits

This disclosure describes an active clamp that may be used to facilitate ESD protection, including on-chip ESD protection. Active clamps are widely used in the field of on-chip ESD protection to protect functional circuitry of the chip. When designing chips with active clamps, circuit designers are often faced with competing objectives. For example, it may be desirable to have an active clamp that provides ESD protection at the package level (e.g. when the chip is uninstalled and/or not powered on). At the system level (e.g. when the chip is installed and powered on), however, it may be desirable for the active clamp to be less responsive to noise. In other words, when the chip is powered on, it may be desirable for the active clamp to be less responsive and only be activated by actual ESD events and not by other types of events. Noise immunity is sometimes achieved by a keep-off circuit that turns the active clamp off when the chip is in normal operation. In this context, normal operation refers to the chip receiving a supply voltage and being in a powered on state. Turning the active clamp off during normal operation, however, prevents, or greatly limits, the active clamp from being able to protect the functional circuitry from ESD events that may occur during normal operation.

This disclosure introduces a keep-off control circuit that may be used to control a keep-off circuit in such a manner that the active clamp is sensitive only to certain amplitudes and frequencies at the node of a pad that is to be protected. As will be explained in greater detail below, according to the techniques of this disclosure, a smart gate-control circuit that includes a keep-off circuit may be used to control the gate of a transistor of the active clamp. The smart gate-control circuit of this disclosure may be configured to distinguish between ESD events and electromagnetic compatibility (EMC)/noise events. When a circuit is in use as part of a larger system, it is common for the circuit to receive noise produced by other components in the system. As one example, a circuit in an automobile, may be configured to communicate with multiple other chips in the automobile. The other chips often create electro-magnetic emissions that can create noise at the input of the circuit. This noise, however, may be harmless to the circuit. The smart gate-control circuit of this disclosure may be configured to provide ESD protection at both the component level and at the system level, while also providing noise immunity when the chip is in a powered state.

An overvoltage refers to a voltage value which is greater than the maximum allowed voltage during normal operation. Therefore, the voltage value at which an overvoltage is present may be a voltage value that is sufficiently higher than maximum allowed voltage that may occur under normal operating conditions, such that no ESD event is detected if the chip is operating under normal conditions.

A voltage spike generally refers to a rate of increase in voltage per time (dV/dT) that is greater than a threshold rate of increase. Therefore, the value of dV/dT at which a voltage spike is present may be a value of dV/dT that is sufficiently higher than value of dV/dT that may occur under normal operating conditions, such that no ESD event is detected if the chip is operating under normal conditions, i.e. sufficiently below a potentially damage-causing value for dV/dT; and such that an ESD event is detected before functional circuitry is damaged. The threshold value for dV/dT may, for some implementations, be in the range of 0.1 V/ns to 100 V/ns. The threshold value for determining what constitutes a voltage spike may, however, vary widely depending on the particular application for which the ESD protection circuit is being implemented. This disclosure will use the term "voltage event" to generally refer to either an overvoltage or a voltage spike.

FIG. 1A shows a schematic view of device 100A, which utilizes an example of ESD protection circuitry. The techniques of this disclosure may be used in conjunction with the ESD protection circuitry of device 100A. Device 100A may, for example, be an IC, PCB, or some other type of circuit. Device 100A includes circuit 102, circuit 104, circuit 106, ESD clamp 108, ESD clamp 110, and ESD clamp 112. Circuit 102, circuit 104, and circuit 106 represent functional circuits, meaning they are configured to perform the desired functionality of device 100A. ESD clamp 108, ESD clamp 110, and ESD clamp 112 represent ESD protection circuitry, meaning they are configured to protect circuit 102, circuit 104, and circuit 106 from ESD events. Device 100A has voltage pin 114, voltage pin 116, and voltage pin 118, which are configured to receive different classes of voltages. Voltage pins 114, 116, and 118 are configured to receive VCP, Vbat, and GND, respectively. VCP may, for example, be a higher voltage than Vbat, which in turn may be a higher voltage than GND.

Circuit 102 is connected between voltage pin 114 and voltage pin 116, and in instances when an ESD event causes a voltage difference greater than VCP−Vbat plus a margin across voltage pins 114 and 116, ESD clamp 108 is configured to direct current away from circuit 102, thus protecting circuit 102 from the overvoltage across voltage pins 114 and 116. Similarly, circuit 104 is connected between voltage pin 116 and voltage pin 118, and in instances when an ESD event causes a voltage difference greater than Vbat−Gnd plus a margin across voltage pins 116 and 118, ESD clamp 110 is configured to direct current away from circuit 104, thus protecting circuit 104 from the overvoltage across voltage pins 116 and 118. Circuit 106 is connected between voltage pin 114 and voltage pin 118, and in instances when an ESD event causes a voltage difference greater than VCP−Gnd plus a margin across voltage pins 114 and 118, ESD clamp 112 is configured to direct current away from circuit 106, thus protecting circuit 106 from the overvoltage across voltage pins 114 and 118. The above examples include a margin factor because the threshold voltages at which ESD clamp 108, ESD clamp 110, and ESD clamp 112 are configured to detect an overvoltage condition may not be the same as the normal operating voltage. Instead, ESD clamp 108, ESD clamp 110, and ESD clamp 112 may, for example, be configured to detect an overvoltage condition at a voltage that is slightly higher than the normal operating voltage.

ESD clamp 108, ESD clamp 110, and ESD clamp 112 may additionally, or alternatively, be configured to detect voltage events (e.g., overvoltages or voltage spikes) across voltage pins 114 and 116, voltage pins 116 and 118, and voltage pins 114 and 118, respectively. Throughout this disclosure, the terms voltage event, overvoltage, and voltage spike are used to refer to short duration electrical transients in voltage in an electrical circuit. Similarly a current event (e.g., an overcurrent or current spike that exceeds a threshold) or an energy event (e.g., a transferred energy or energy spike that exceeds a threshold) are used to refer to short duration electrical transients in current or electrical energy, respectively, in an electrical circuit. As can be seen in the example of FIG. 1A, three separate ESD clamps are used to protect three separate functional circuits from ESD events that may occur between different voltage pins. Each of ESD clamp 108, ESD clamp 110, and ESD clamp 112 may be configured with the smart gate-control circuit of this disclosure.

Figure 1B:
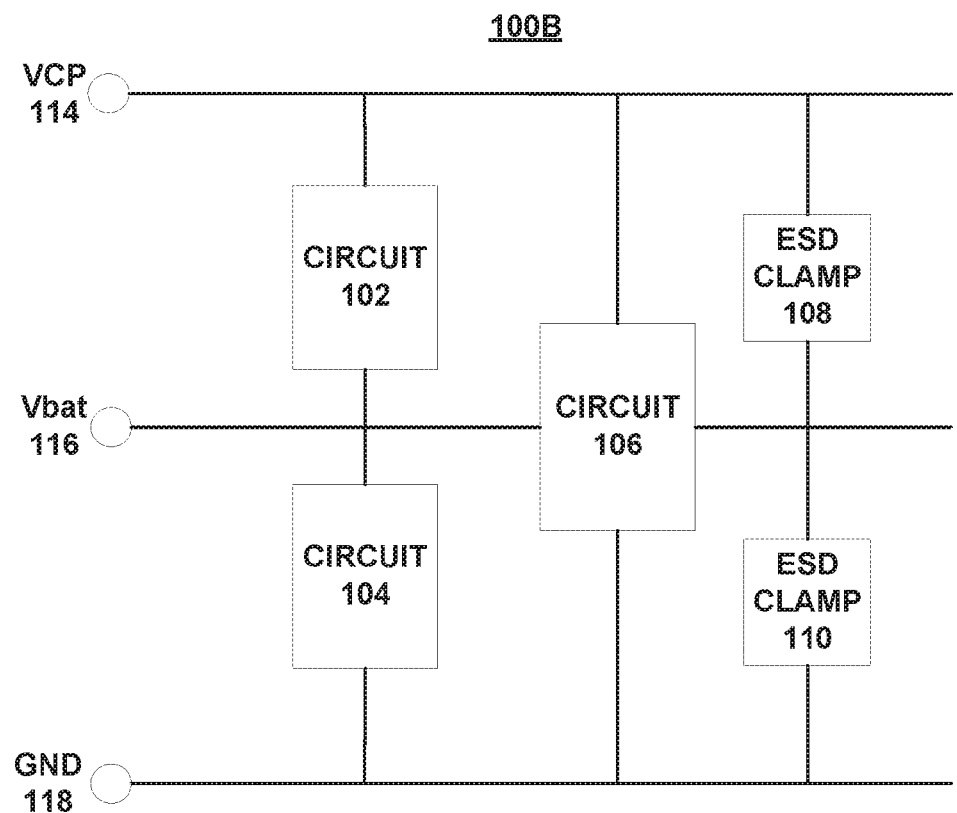
FIG. 1B shows a schematic view of a prior art ESD concept using stacked ESD clamps to protect different circuits

FIG. 1B shows a schematic view of device 100B, which utilizes another example of ESD protection circuitry. Device 100B uses stacked ESD clamps to protect different functional circuits. The components shown in FIG. 1B generally behave in the same manner as like-numbered components described above with respect to FIG. 1A, but device 100B only includes two ESD clamps instead of three. In Device 100B, ESD clamp 108 and ESD clamp 110 are cascaded to protect circuit 106 from an overvoltage condition across voltage pins 114 and 118. Thus in the configuration of device 100B, circuit 106 is connected between voltage pin 114 and voltage pin 118, and in instances when an ESD event causes a voltage difference greater than VCP−Gnd across voltage pins 114 and 118, the combination of ESD clamp 108 and ESD clamp 110 is configured to direct current away from circuit 106, thus protecting circuit 106 from the overvoltage across voltage pins 114 and 118. In the example of FIG. 1B, each of ESD clamp 108 and ESD clamp 110 may be configured with the smart gate-control circuit of this disclosure.

Figure 2A:
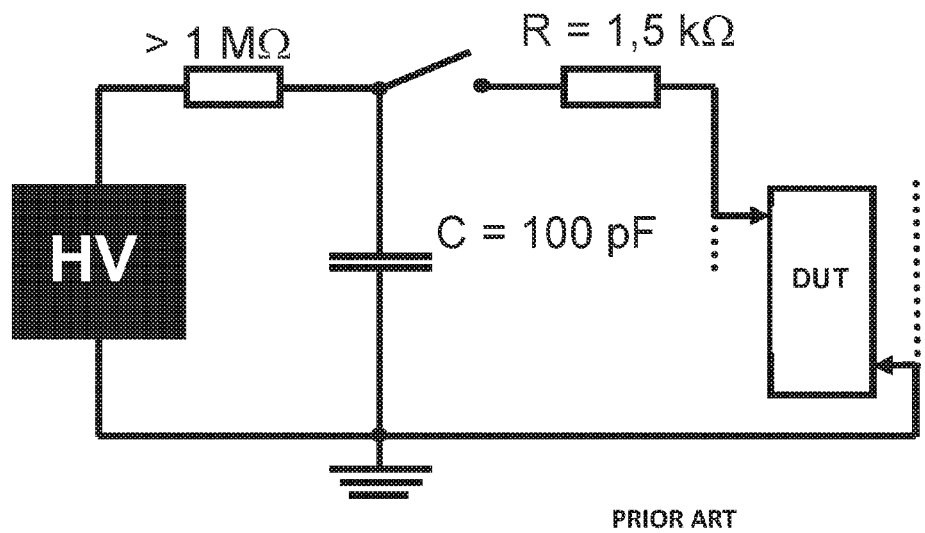
FIG. 2A shows a circuit representing a human body model (HBM) that can simulate a charged operator.
Figure 2B:
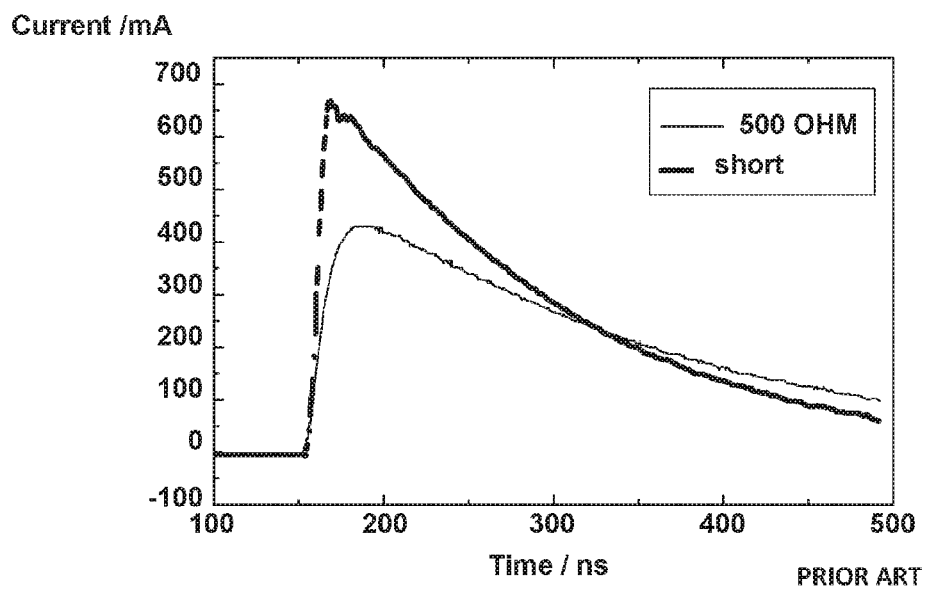
FIG. 2B shows an example of a discharge profile produced by the HBM circuit in FIG. 2A.

FIG. 2A shows a circuit representing a human body model that can simulate a charged operator. At a charging voltage of 1000V, when discharged, the circuit of FIG. 2A can produce a peak current of approximately 600-740 mA, with a rise time of approximately 2 ns to 10 ns and a decay time of approximately 130 ns to 170 ns. The discharge profile shown in FIG. 2B represents an example of a type of discharge which the techniques of this disclosure may help to protect against. Such and other types of discharges (system level ESD events) may, for example, occur either while a chip is in normal operation or while the chip is in a power off state.

Figure 3:
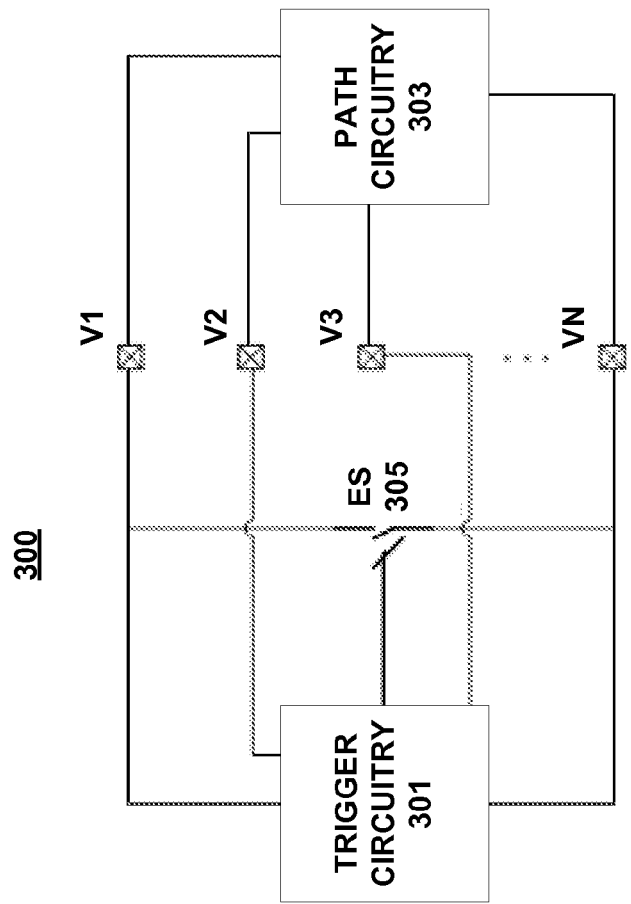
FIG. 3 shows an example of a circuit that includes ESD protection in accordance with the techniques of this disclosure.

FIG. 3 shows an example of a circuit that includes ESD protection in accordance with the techniques of this disclosure. Circuit 300 includes trigger circuitry 301, path circuitry 303, and electronic switch 305. The smart gate-control circuit of this disclosure may, for example, be implemented as part of trigger circuitry 301 and may control the gate of electronic switch 305. Circuit 300 includes N nodes, labeled in FIG. 3 as V1, V2, V3 . . . VN. The nodes of FIG. 3 may, for example, correspond to cascaded voltage input pins. In the example, of FIG. 3, it can be assumed that under normal operating conditions, the voltage at V1 represents a highest voltage and the voltage at VN represents a lowest voltage. Thus, in the example of FIG. 3, electronic switch 305 is connected between the highest voltage (V1) and the lowest voltage (VN). Upon detecting a voltage event, such as an overvoltage or voltage spike, across any two of the N nodes, trigger circuitry 301 can turn on electronic switch 305, causing the current created by the voltage event to flow through electronic switch 305 to a ground or reference voltage and away from functional circuitry that could potentially be damaged by the voltage event. For example, upon detecting a voltage event across nodes V2 and VN, trigger circuitry 301 can turn on electronic switch 305, and path circuitry 303 can create a discharge path from node V2, through node V1, and through electronic switch 305 to VN.

Figure 4:
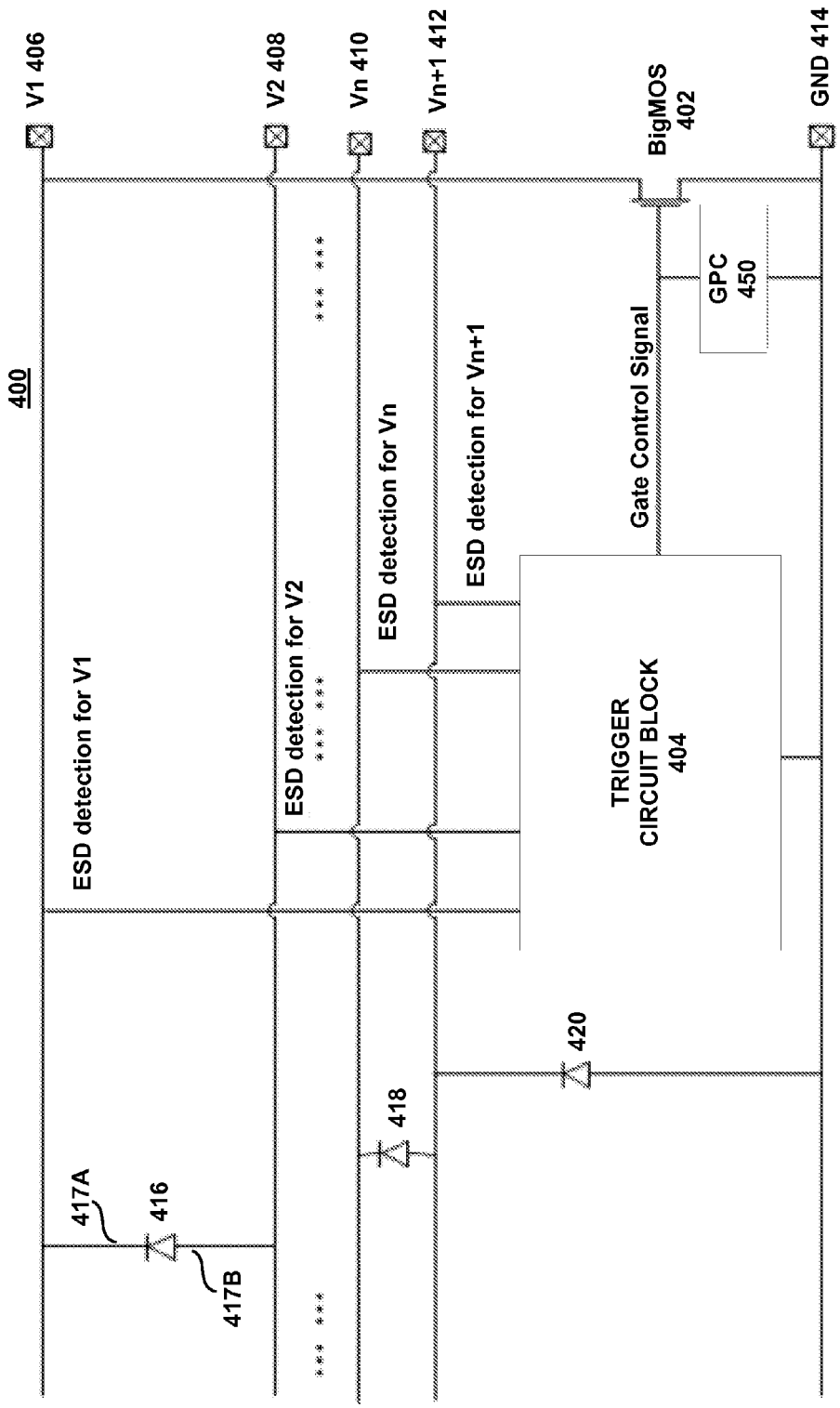
FIG. 4 shows an example of a circuit that includes ESD protection in accordance with the techniques of this disclosure.

FIG. 4 shows circuit 400, which includes ESD protection in accordance with the techniques of this disclosure. Circuit 400 includes BigMOS 402, trigger circuit block 404, and voltage pins 406, 408, 410, 412, and 414. Circuit 400 also includes diode 416, diode 418, and diode 420. The ellipses shown between $V_2$ and $V_N$ are intended to represent voltage pins, and corresponding ESD protection circuitry that is not explicitly shown in FIG. 4, meaning that the techniques of FIG. 4 are not limited to circuits with a specific number of voltage pins but instead may be used with a variable number of voltage pins. Circuit 400 also optionally includes gate protection circuitry (GPC) 450 configured to protect the gate oxide of the BigMOS from overvoltage in case of an ESD event. GPC 450, however, is not required for implementing the techniques of this disclosure and, furthermore, gate protection circuitry may be unnecessary for certain types of ESD switches, such as bipolar transistors or thyristors. The smart gate-circuit of this disclosure, which will be described in more detail later, may, for example, be implemented as part of trigger circuit block 404 and may be configured to control the gate of BigMOS 402.

In the example of FIG. 4, voltage pin 406 is configured to receive voltage $V_1$; voltage pin 408 is configured to receive voltage $V_2$; voltage pin 410 is configured to receive voltage $V_N$; voltage pin 412 is configured to receive voltage $V_{N+1}$; and voltage pin 414 is configured to receive voltage GND. A drain of BigMOS 402 is connected to the highest voltage input pin of circuit 400, which is voltage pin 406 in the example of FIG. 4, and a source of BigMOS 402 is connected to the lowest voltage input pin of circuit 400, which is voltage pin 414 in the example of FIG. 4. As used in this disclosure, the term connected should not be interpreted to only mean directly connected, as in some instances two components may be connected via intermediate components. Voltages $V_2$, $V_N$, and $V_{N+1}$ may be any voltages between $V_1$ and GND; however, for purposes of example, it may be assumed for FIG. 4, that the following condition holds: $V_1 > V_2 > V_N > V_{N+1} >$ GND. $V_1$, $V_2$, $V_N$, $V_{N+1}$, and GND represent the voltages that voltage pins 406, 408, 410, 412, and 414 are configured to receive under normal operating conditions.

Each of voltage pins 406, 408, 410, 412, and 414 connects to trigger circuit block 404. Trigger circuit block 404 may be configured to detect a voltage event, such as an overvoltage and/or a voltage spike, between any combination of two pins of voltage pins 406, 408, 410, 412, and 414. An overvoltage generally occurs when the voltage between two pins is greater than the normal operating voltage between those two pins. Therefore, the voltage value at which trigger circuit block 404 may be configured to determine that an overvoltage is present may be a voltage that is sufficiently higher than the normal operating voltage for the two pins, such that trigger circuit block 404 does not detect an overvoltage when circuit 400 is operating under normal conditions, but sufficiently below a potentially damage-causing voltage level, such that trigger circuit block 404 detects an overvoltage before functional circuitry is damaged. In circuit 400, for example, the normal operating voltage between voltage pin 406 and voltage pin 408 is $V_1$-$V_2$. Therefore, trigger circuit block 404 may be configured to detect an overvoltage at a voltage that is typically 101% to 200% of $V_1$-$V_2$ or an absolute value of between 0.5V and 15V above $V_1$-$V_2$. The specific voltage at which trigger circuit block 404 detects an overvoltage may be adjusted based on design considerations that may vary for different circuits being used in different applications.

Diode 416, diode 418, and diode 420 may all comprise forward-biased diodes. In the schematic of FIG. 4, diode 416 has terminal 417A and 417B. When the voltage at terminal 417A is greater than the voltage at terminal 417B, then little or no current flows through diode 416. When the voltage at terminal 417B is sufficiently greater than the voltage at terminal 417A, then current flows through diode 416 from terminal 417B to terminal 417A. As mentioned above, under normal operating conditions, $V_1 > V_2$, meaning little or no current flows through diode 416; however, when a voltage event occurs at voltage pin 408, the voltage at terminal 417B may be larger than the voltage at terminal 417A causing current to flow through diode 416. Diode 418 and diode 420 generally behave in the same manner as diode 416, and under normal operating conditions, little or no current flows through diode 418 and diode 420.

In response to detecting a voltage event, trigger circuit block 404 sends a gate control signal to BigMOS 402, and turns BigMOS 402 "on" so that current flows through BigMOS 402. The gate control signal turns on BigMOS 402 such that current flows from the drain of BigMOS 402 to the source of the BigMOS 402 which is connected to ground. Under normal operating conditions, however, trigger circuit block 404 does not send a gate control signal to BigMOS 402, and BigMOS 402 is "off" so that very little current flows through BigMOS 402. In this disclosure, saying a BigMOS is "on" is generally intended to mean that the BigMOS is conducting current, while saying the BigMOS is "off" is generally meant to mean the BigMOS is not conducting current.

As one example, under normal operating conditions, voltage pin 406 receives voltage $V_1$, and voltage pin 414 receives voltage GND, meaning the voltage across voltage pins 406 and 414 is $V_1$-GND. Circuit 400 may include portions of functional circuitry (not shown in FIG. 4) that operate at a voltage of $V_1$-GND. When the voltage across voltage pins 406 and 414 is $V_1$-GND, then trigger circuit block 404 does not detect an overvoltage and does not send a gate signal to turn on BigMOS 402. If, however, an ESD event occurs at voltage pins 406 and 414, then the voltage across voltage pins 406 and 414 may be higher than $V_1$-GND, in which case trigger circuit block 404 detects the overvoltage condition and sends a gate control signal to BigMOS 402, which turns on BigMOS 402. When BigMOS 402 is on, current caused by the overvoltage condition flows through BigMOS 402 to ground as opposed to flowing through functional circuitry, which could potentially damage the functional circuitry.

In a separate example, under normal operating conditions, voltage pin 408 receives voltage $V_2$, and voltage pin 414 receives voltage GND, meaning the voltage across voltage pins 408 and 414 is $V_2$-GND. Circuit 400 may include portions of functional circuitry (not shown in FIG. 4) that operate at a voltage of $V_2$-GND. When the voltage across voltage pins 408 and 414 is $V_2$-GND, then trigger circuit block 404 does not detect an overvoltage and does not send a gate signal to turn on BigMOS 402. If, however, an ESD event occurs at voltage pins 408 and 414, then the voltage across voltage pins 408 and 414 may be higher than $V_2$-GND, in which case trigger circuit block 404 detects the overvoltage condition and sends a gate control signal to BigMOS 402, which turns on BigMOS 402. When BigMOS 402 is on, current caused by the overvoltage condition flows through diode 416 and BigMOS 402 to ground as opposed to flowing through functional circuitry, which could potentially damage the functional circuitry.

In the example of a voltage event at voltage pins 406 and 414, as described above, the current caused by the voltage event can flow directly from voltage pin 406 to ground through BigMOS 402 because, as mentioned above, voltage pin 406 is configured to receive the highest voltage and is connected directly to BigMOS 402. Voltage pin 408, however, is not connected directly to BigMOS 402. Instead, when a voltage event occurs between voltage pins 408 and 414, the current caused by the voltage event flows to ground through diode 416 and through BigMOS 402. When an overvoltage event occurs between voltage pins 410 and 414, the current caused by the overvoltage flows to ground through diode 418, further diode(s) between pins 410 and 408 (represented by the ellipses in FIG. 4), diode 416, and BigMOS 402.

Figure 5:
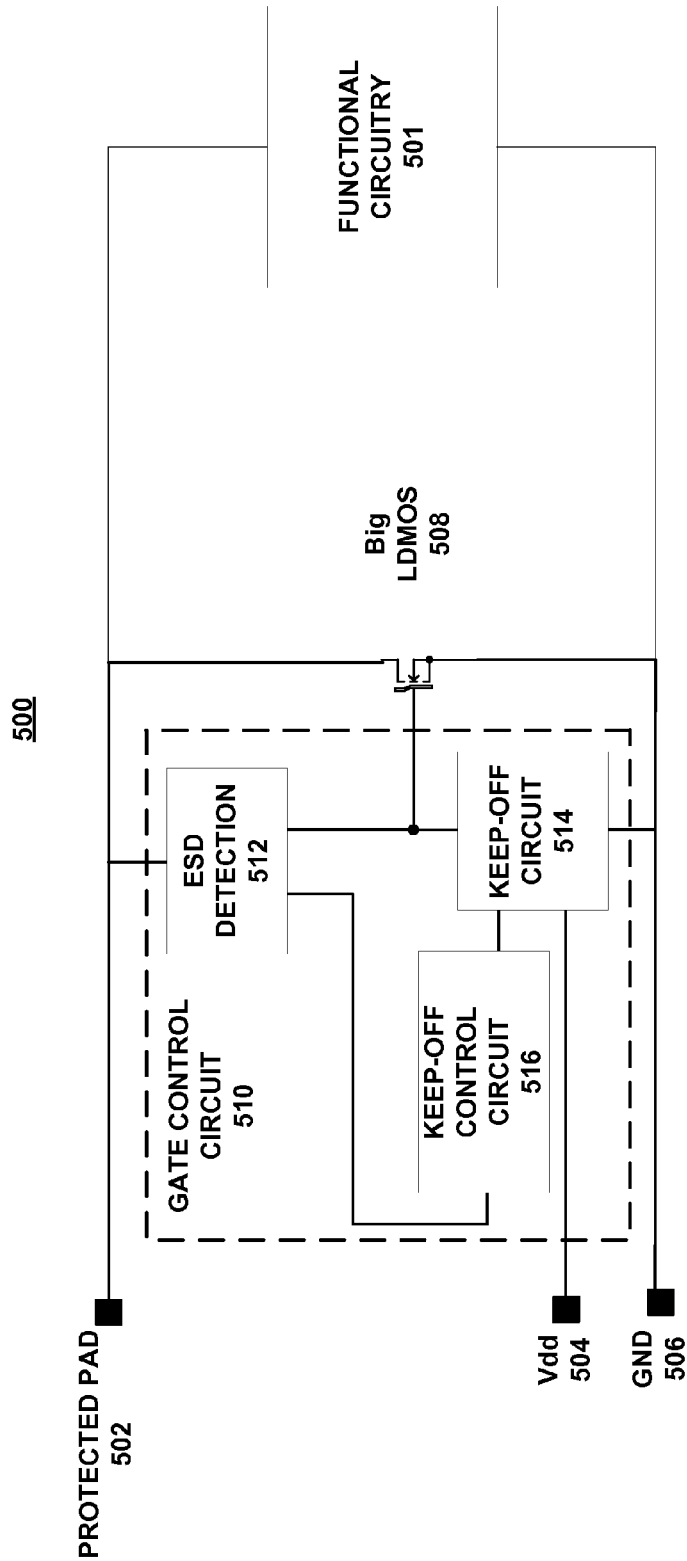
FIG. 5 shows an example of active clamp circuitry according to the techniques of this disclosure.

FIG. 5 shows an example of active clamp circuitry according to the techniques of this disclosure. Circuit 500 includes functional circuitry 501, protected pad 502, VDD input 504, and ground (GND) 506, big LDMOS 508, and gate control circuit 510. The active clamp circuitry (i.e. Big LDMOS 508 and gate control circuit 510) of circuit 500 is configured to protect protected pad 502 from an ESD event. Gate control circuit 510 includes ESD detection circuitry 512, keep-off circuit 514, and keep-off control circuit 516. The active clamp of circuit 500 may, for example, protect functional circuitry 501 from an ESD event that occurs between protected pad 502 and GND 506. Protected pad 502 represents an input/output (I/O) or supply (herein after referred to simply as "input") to functional circuit 501. Circuitry similar to gate control circuit 510 may also, for example, be implemented as part of ESD clamps 108, 110, and 112 of FIGS. 1A and 1B, as part of trigger circuitry 301 of FIG. 3, or as part of trigger circuit block 404 of FIG. 4.

Input Vdd 504 represents an input (without any loss of generality connected to Vdd supply line) for keep-off circuit 514. Thus, if circuit 500 is either uninstalled or in a power off state, then Vdd is equal to 0V, and as will be explained in more detail later, keep-off circuit 514 is disabled. When circuit 500 is in a power off state and ESD detection circuit 512 detects an ESD event across protected pad 502 and GND 506, then ESD detection circuit 512 turns on Big LDMOS 508 and current is directed from protected pad 502 through Big LDMOS 508 to ground rather than through functional circuitry which may potentially be damaged by the ESD event. As one example, the normal operating voltage at protected pad 502 may be 30V. Thus, ESD detection circuit 512 may be configured to turn on Big LDMOS in response to an overvoltage (e.g. a voltage of 35V or greater) in order to protect functional circuitry from an overvoltage event. These voltages are just examples, and it is of course contemplated that circuit 500 may be used in conjunction with circuits operating at other voltages.

When circuit 500 is in normal operation, Vdd may, for example, be 5V. During normal operation, keep-off control circuit 516 may turn on keep-off circuit 514. When keep-off circuit 514 is "on," keep-off circuit 514 turns the active clamp of circuit 500 "off." Keep-off circuit 514 turns the active clamp of circuit 500 off by dropping the gate voltage of Big LDMOS 508 to ground, such that the gate-to-source voltage of Big LDMOS 508 is approximately 0V or at least below the threshold voltage (Vth) of Big LDMOS 508, and Big LDMOS is "off," meaning there is no significant drain-to-source current through Big LDMOS 508. When keep-off circuit 514 is "on," and Big LDMOS 508 is "off," then Big LDMOS 508 may not have a drain-to-source current even if the voltage between protected pad 502 and GND 506 is greater than the overvoltage. In other words, even if ESD detection circuit 512 detects an overvoltage value, then Big LDMOS 508 still may not turn on. When circuit 500 is not powered and Vdd is 0V, then an overvoltage (e.g. 35V) may cause Big LDMOS 508 to direct current from protected pad 502 to ground, but when circuit 500 is in normal operation and Vdd is 5V, then the overvoltage of 35V may not cause Big LDMOS 508 to direct current from protected pad 502 to ground and away from functional circuit 501. The 35V across protected pad 502 and GND 506 may not be an ESD event, and thus, Big LDMOS 508 turning on may result in a current drain that causes functional circuitry 501 to malfunction.

During normal operation mode, Big LDMOS 508 may still turn on in some instances based on ESD events detected by ESD detection circuit 512. To determine when to turn Big LDMOS 508 on and when to keep Big LDMOS 508 off, keep-off control circuit 516 may be configured to distinguish between an ESD event and other switching events based on a combination of the frequency and amplitude of the events. In response to an event with ESD-like frequency and amplitude, keep-off control circuit 516 may turn keep-off circuit 514 off. When keep-off circuit 514 is off, then Big LDMOS 508 may turn on in response to ESD detection 512 detecting an ESD event. A more detailed explanation of how keep-off control circuit 516 distinguishes between ESD-type events and other events based on frequency and amplitude will be provided below.

Said differently, FIG. 5 shows circuit 500 including electrostatic discharge (ESD) protection circuitry (e.g., Big LDMOS 508), keep-off circuitry (e.g., keep-off circuit 514), ESD detection circuitry (e.g., ESD detection circuitry 512), and keep-off control circuit 516 which is configured to enable the ESD protection circuitry and disable the keep-off circuitry when the ESD detection circuitry detects an ESD event for both unpowered and powered chip operation modes. In some examples, the ESD detection circuitry (e.g., ESD detection circuitry 512) and keep-off control circuit 516 are further configured to enable the ESD protection circuitry (e.g., big LDMOS 508) and disable the keep-off circuitry (e.g., keep-off circuit 514) when the ESD detection circuitry detects an ESD event and when circuit 500 is operating in a powered on state (e.g., when power is applied to Vdd).

In some examples, the ESD detection circuitry (e.g., ESD detection circuitry 512) and keep-off control circuit 516 is further configured to disable the ESD protection circuitry (e.g., big LDMOS 508) and enable the keep-off circuitry (e.g., keep-off circuit 514) when the ESD detection circuitry does not detect the ESD event. In some examples, the ESD detection circuitry is further configured to disable the ESD protection circuitry (e.g., big LDMOS 508) and enable the keep-off circuitry (e.g., keep-off circuit 514) when the ESD detection circuitry does not detect the ESD event and circuit 500 is operating in a powered on state (e.g., when power is applied to Vdd).

In some examples, the ESD detection circuitry (e.g., ESD detection circuitry 512) and keep-off control circuit 516 is configured to detect the ESD event when the ESD detection circuitry determines that a voltage at an input of circuit 500 (e.g., protected pad 502) satisfies both a voltage level threshold (e.g., a breakdown voltage of a diode trigger chain of gate control circuit 510) and a frequency threshold (e.g., a time constant associated with gate control circuit 510). In some examples, the ESD detection circuitry (e.g., ESD detection circuitry 512) and keep-off control circuit 516 is configured to detect a non-ESD event and not detect the ESD event when the ESD detection circuitry detects a voltage at an input of circuit 500 (e.g., protected pad 502) that does not satisfy a voltage level threshold or a frequency threshold.

In some examples, the keep-off-control circuitry comprises a switch (e.g., big LDMOS 508), and the ESD detection circuitry (e.g., ESD detection circuitry 512) is configured to not enable the ESD protection circuitry by means of the keep-off-control circuitry by controlling the switch when the keep-off circuitry is enabled. In other words, the ESD detection circuitry is configured to refrain from enabling the ESD protection circuitry when the switch of the keep-off-control circuitry is enabled.

In some examples, the keep-off-control circuitry comprises a switch (e.g., big LDMOS 508), and the ESD detection circuitry (e.g., ESD detection circuitry 512) is configured to enable the ESD protection circuitry by controlling the switch to disable the keep-off circuitry. In other words, if the ESD detection circuitry detects an ESD event based on a voltage event, the ESD detection circuitry may disable the keep-off circuitry by inactivating the switch of the keep-off-control circuitry to disable the keep-off circuitry.

In some examples, the ESD detection circuitry (e.g., ESD detection circuitry 512) comprises a diode trigger chain for enabling the ESD protection circuitry. In some examples, the ESD detection circuitry is configured to detect the ESD event and enable the ESD protection circuitry (e.g., big LDMOS 508) when a voltage across the diode trigger chain exceeds a breakdown voltage associated with the diode trigger chain and satisfies a frequency threshold based on a time constant associated with the ESD detection circuitry. In some examples, the ESD detection circuitry comprises at least one capacitor and at least one resistor and the time constant associated with the ESD detection circuitry is based on the at least one capacitor and the at least one resistor. In some examples, the time constant associated with the ESD detection circuitry is based on a parasitic capacitance associated with one or more elements of the ESD detection circuitry.

Figure 6:
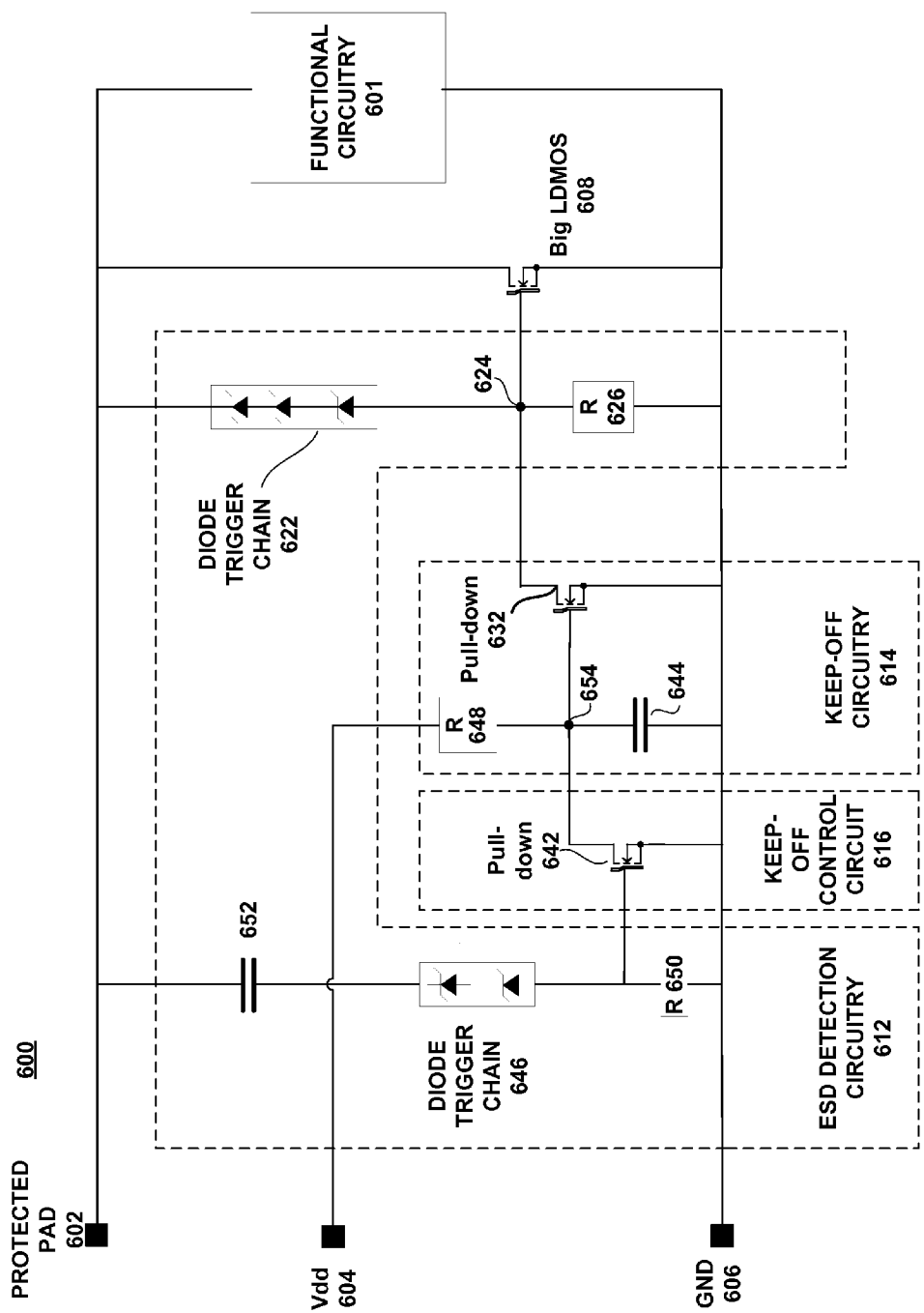
FIG. 6 shows an example of active clamp circuitry according to the techniques of this disclosure.

FIG. 6 shows an example of active clamp circuitry according to the techniques of this disclosure. Circuit 600 includes functional circuitry 601, protected pad 602, VDD input 604, and ground (GND) 606, and big LDMOS 608. Circuit 600 also includes ESD detection circuitry 612, keep-off circuitry 614, and keep-off control circuitry 616. The active clamp of circuit 600 may, for example, protect functional circuitry 601 from an ESD event that occurs between protected pad 602 and GND 606. Protected pad 602 represents an input to functional circuitry 601. ESD detection circuitry 612, keep-off circuitry 614, and keep-off control circuitry 616 generally operate in the same manner as ESD detection circuitry 512, keep-off circuitry 514, and keep-off control circuitry 516 of FIG. 5, but FIG. 6 shows more detail and will be described in more detail.

VDD input 604 represents a supply line input for keep-off circuit 614. Thus, if circuit 600 is either uninstalled or in a power off state, then VDD input 604 is equal to 0V, and as will be explained in more detail later, keep-off circuitry 614 is off. When circuit 600 is in a power off state and ESD detection circuitry 612 detects an ESD event across protected pad 602 and GND 606, then ESD detection circuitry 612 turns on Big LDMOS 608 and current is directed from protected pad 602 through Big LDMOS 608 to ground rather than through functional circuitry 601 which may potentially be damaged by the ESD event.

ESD detection circuitry 612 includes diode trigger chain 622, resistor 626, diode trigger chain 646, resistor 650, and capacitor 652. When circuit 600 is not installed or powered down (i.e. VDD input 604=0V), ESD detection circuitry 612 may detect an ESD event at protected pad 602 when the voltage across protected pad 602 and GND 606 exceeds the breakdown voltage of diode trigger chain 622. When the voltage between protected pad 602 and GND 606 is below the breakdown voltage of diode trigger chain 622, then no current flows through diode trigger chain 622. When the voltage between protected pad 602 and GND 606 exceeds the breakdown voltage of diode trigger chain 622, then voltage flows through diode trigger chain 622 and creates a voltage at node 624 across resistor (R) 626. Node 624 generally corresponds to the gate of Big LDMOS 608, and the voltage across resistor 626 (i.e. the gate-to-source voltage of Big LDMOS 608, if greater than the voltage threshold (Vth) of Big LDMOS 608 causes Big LDMOS 608 to conduct current from protected pad 602 to GND 606.

As one example, the normal operating voltage at protected pad 602 may be 30V. Thus, ESD detection circuit 612 may be configured to turn on Big LDMOS 608 in response to an overvoltage (e.g. a voltage of 35V or greater) in order to protect functional circuitry 601 from an overvoltage event. The diodes of diode trigger chain 622 may be selected such that the breakdown voltage of diode trigger chain 622 corresponds to the overvoltage at which the active clamp turns on.

Keep-off circuitry 614 includes pull-down transistor 632, capacitor 644, and resistor 648. When circuit 600 is in normal operation, VDD input 604 may, for example, be 5V. During normal operation, keep-off control circuit 616 may turn on keep-off circuit 614. When keep-off circuit 614 is "on," keep-off circuitry 614 turns the active clamp of circuit 600 "off." Keep-off circuit 614 turns the active clamp of circuit 600 off by dropping the gate voltage of Big LDMOS 608 to ground, such that the gate-to-source voltage of Big LDMOS 608 is approximately 0V, and Big LDMOS 608 is "off," meaning there is no drain-to-source current through Big LDMOS 608.

In some examples, if keep-off control circuit 616 is omitted from circuit 600, and when keep-off circuitry 614 is "on," and Big LDMOS 608 is "off," then Big LDMOS 608 may not have a drain-to-source current even if the voltage between protected pad 602 and GND 606 is greater than the overvoltage (e.g. even if the voltage between protected pad 602 and GND 606 exceeds the breakdown voltage of the diode trigger chain 622). In other words, without keep-off control circuit 616, even if ESD detection circuit 612 detects an overvoltage value, then Big LDMOS 608 may still not turn on, regardless if the overvoltage is due to an EMC event (in this case Big LDMOS to be turned off is desired) or due to an ESD event (Big LDMOS to be turned off is not desired).

In some examples, if keep-off control circuit 616 is omitted from circuit 600, and when circuit 600 is not powered on and VDD input 604 is 0V, then an overvoltage (e.g. 35V) may cause Big LDMOS 608 to direct current from protected pad 602 to ground. However, when circuit 600 is in normal operation and VDD input 604 is 5V, then the overvoltage of 35V may not cause Big LDMOS 608 to direct current from protected pad 602 to ground and away from functional circuit 601. The 35V across protected pad 602 and GND 606 may not be an ESD event, and thus, Big LDMOS 608 turning on may result in a current drain that causes functional circuitry 601 to malfunction. On the other side, if the 35V across protected pad 602 and GND 606 may be an ESD event, Big LDMOS 608 must turn on to protect functional circuitry 601. Circuit 600 may rely on keep-off control circuit 616 to turn on Big LDMOS 608 to protect functional circuitry 601 during an actual ESD event without interfering with the operation of functional circuitry 601 by turning on Big LDMOS 608 during a non-ESD event.

A drain of pull-down transistor 632 is connected to a gate of Big LDMOS 608 at node 624. When pull-down transistor 632 is on, then a drain-to-source current of pull-down transistor 632 flows from node 624, through pull-down transistor 632, to GND 606. Thus, when pull-down transistor 632 is on, the voltage at node 624 is brought down to ground, meaning the gate-to-source voltage of Big LDMOS 608 is approximately zero. A gate-to-source voltage of approximately 0V disables the active clamp of circuit 600, meaning Big LDMOS 608 does not conduct a drain-to-source current even when diode trigger chain 622 detects an ESD event. When pull-down transistor 632 is off, then the gate voltage of Big LDMOS 608 is not pulled down to ground by pull-down transistor 632 and the active clamp is enabled. In this case, the active clamp being enabled means that Big LDMOS 608 will turn on in response to diode trigger chain 622 detecting an ESD event. The active clamp of circuit 600 can be enabled and disabled by turning pull-down transistor 632 off and on, respectively. As will be described in greater detail below, pull-down transistor 632 can be turned on and off based on a gate control signal received from keep-off-control circuit 616.

During normal operation mode, Big LDMOS 608 may still turn on in some instances based on ESD events detected by ESD detection circuit 612. To determine when to turn Big LDMOS 608 on and when to keep Big LDMOS 608 off, ESD detection circuitry 612 may be configured to distinguish between an ESD event and other switching events based on a combination of the frequency and amplitude of the events. In response to an event with ESD-like frequency and amplitude, keep-off control circuit 616 may turn keep-off circuit 614 off. When keep-off circuit 614 is off, then Big LDMOS 608 may turn on in response to ESD detection 612 detecting an ESD event.

Keep-off control circuit 616 includes pull-down transistor 642 and optionally a resistor 648 and capacitor 644. A drain of pull-down transistor 642 is connected to a gate of pull-down transistor 632. When pull-down transistor 642 is on, then a drain-to-source current of pull-down transistor 642 flows from node 654, through pull-down transistor 642, to GND 606. Thus, when pull-down transistor 642 is on, the voltage at node 654 is brought down to ground, meaning the gate-to-source voltage of pull-down transistor 632 is approximately zero. A gate-to-source voltage of approximately 0V turns off pull-down transistor 632; meaning pull-down transistor 632 does not conduct a drain-to-source current. When pull-down transistor 642 is off, then the gate voltage of pull-down transistor 632 is not pulled down to ground, and pull-down transistor 632 conducts current from drain to source if turned on by node 604 (e.g., if the chip is powered). Resistor 648 and capacitor 644 are included in circuit 600 to bias the gate of pull-down transistor 632 to Vdd, to also stabilize the voltage on node 654 in case of any noise on node 604, and further to limit the current from node 604 to node 606 if pull-down transistor 642 is turned on.

In circuit 600, turning pull-down transistor 642 on causes pull-down transistor 632 to be turned off, and turning pull-down transistor 632 off, causes the active clamp to be enabled. Turning pull-down transistor 642 off, causes pull-down transistor 632 to be turned on, and turning pull-down transistor 632 on causes the active clamp to be disabled during powered on state (e.g. VDD=5V). This behavior is summarized in Table 1 below for the case that the chip is powered on, meaning the voltage at node 604 is higher than threshold level of pull-down transistor 632.

TABLE 1

| PULL-DOWN 642 | PULL-DOWN 632 | ACTIV CLAMP |
|---|---|---|
| On | Off | Enabled |
| Off | On | Disabled |

As introduced above, during normal operation, keep-off control circuit 616 is configured to control keep-off circuit 614 in such a way that keep-off circuit 614 enables the active clamp of circuit 600 in response to ESD events but disables the active clamp in response to other switching events. ESD detection circuitry 612 distinguishes between ESD events and other events based on a combination of the frequency and amplitude of the events. In response to the voltage between protected pad 602 and GND 606 exceeding the breakdown voltage of diode trigger chain 646, current will flow through diode trigger chain 646, creating a voltage across resistor 650, which corresponds to a gate-to-source voltage of pull-down transistor 642.

In some examples, diode trigger chain 646 may have a breakdown voltage that is sufficiently large to safely distinguish between ESD and non-ESD events when combined with a voltage increase rate criterion given by capacitor 652. In some examples, the breakdown voltage of diode trigger chain 646 may be approximately the same as an overvoltage between a protected pad and ground. In some examples, depending on capacitance of capacitor 652 and resistance of resistor 650, the breakdown voltage of diode trigger chain 646 may be different from an overvoltage between a protected pad and ground.

To account for frequency of voltage increases (e.g., slow voltage increases or fast voltage increases detection circuit 612 relies on a time constant (e.g., RC) of capacitor 652 and resistor 650. In some examples where no overvoltage occurs, the gate of pull-down transistor 642 is decoupled by capacitor 652 and diode trigger chain 646 and put to GND 606 by resistor 650. If an overvoltage event has a voltage increase rate in a similar time frame or shorter than the time constant of capacitor 652 and resistor 650, and the voltage amplitude exceeds a threshold (e.g., breakdown) voltage of diode trigger chain 646, then the voltage at the gate of pull-down transistor 642 will increase according to the voltage increase of the overvoltage event.

Figure 7:
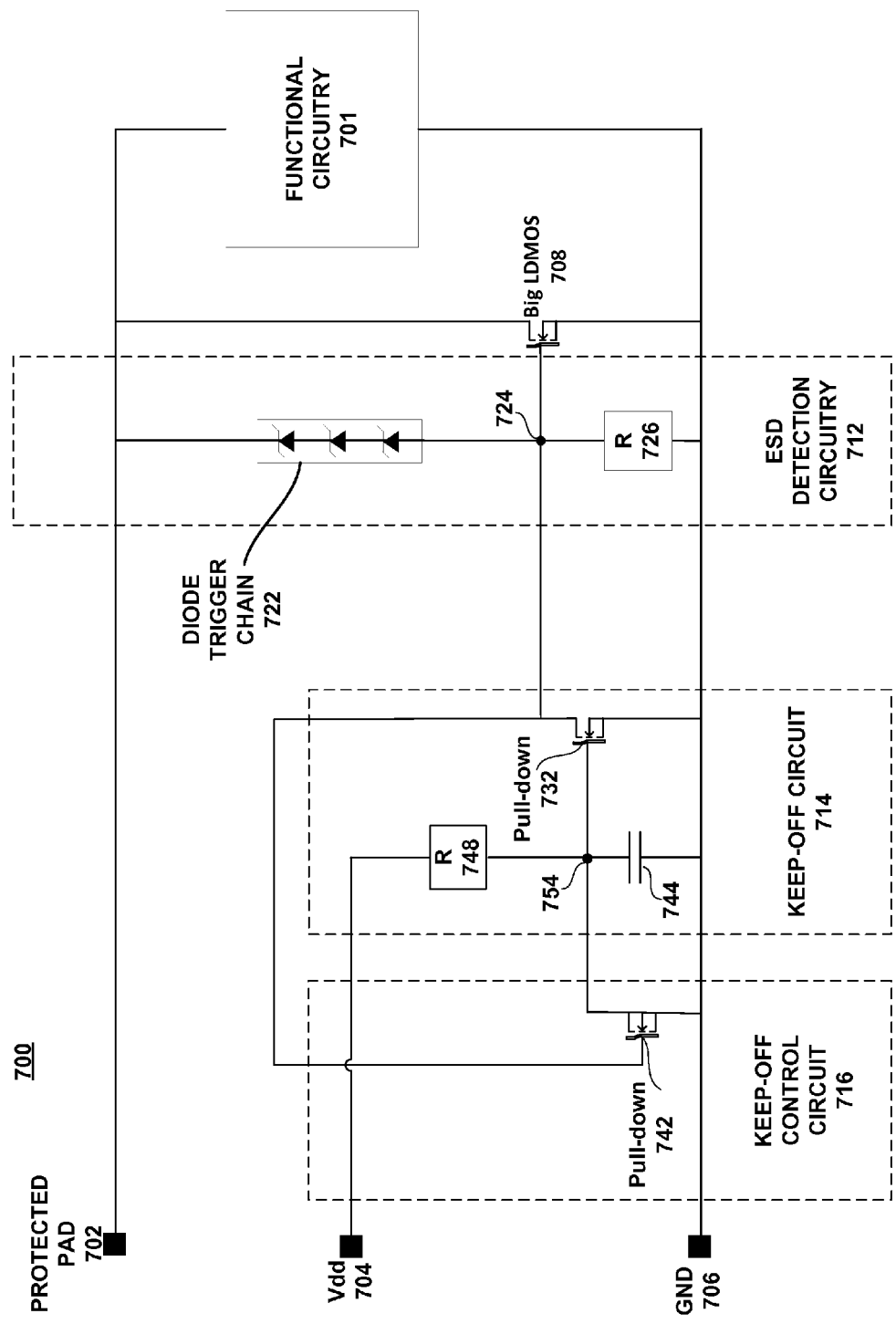
FIG. 7 shows an example of active clamp circuitry according to the techniques of this disclosure.

FIG. 7 shows an example of active clamp circuitry according to the techniques of this disclosure. Circuit 700 includes functional circuitry 701, protected pad 702, VDD input 704, and ground (GND) 706, and big LDMOS 708. Circuit 700 also includes ESD detection circuitry 712, keep-off circuitry 714, and keep-off control circuitry 716. In Circuit 700, keep-off circuitry 714 and keep-off control circuitry 716 generally operate in the same manner described above in relation to keep-off circuitry 614 and keep-off control circuitry 616 of circuit 600, but circuit 700 implements an alternate configuration for its ESD detection circuitry. The active clamp of circuit 700 may, for example, protect functional circuitry 701 from an ESD event that occurs between protected pad 702 and GND 706. Protected pad 702 represents an input to functional circuitry 701. ESD detection circuitry 712, keep-off circuitry 714, and keep-off control circuitry 716 generally operate in the same manner as ESD detection circuitry 512, keep-off circuitry 514, and keep-off control circuitry 516 of FIG. 5, but FIG. 7 shows more detail and will be described in more detail.

Input Vdd 704 represents a supply line input for keep-off circuit 714. Thus, if circuit 700 is either uninstalled or in a power off state, then Vdd is equal to 0V, and as will be explained in more detail later, keep-off circuitry 714 is disabled. When circuit 700 is in a power off state and ESD detection circuitry 712 detects an ESD event across protected pad 702 and GND 706, then ESD detection circuitry 712 turns on Big LDMOS 708 and current is directed from protected pad 702 through Big LDMOS 708 to ground rather than through functional circuitry 701 which may potentially be damaged by the ESD event.

ESD detection circuitry 712 includes diode trigger chain 722 and resistor 726. When circuit 700 is not installed or powered down (i.e. Vdd=0V), ESD detection circuitry 712 may detect an ESD event at protected pad 702 when the voltage across protected pad 702 and GND 706 exceeds the breakdown voltage of diode trigger chain 722. When the voltage between protected pad 702 and GND 706 is below the breakdown voltage of diode trigger chain 722, then no current flows through diode trigger chain 722. When the voltage between protected pad 702 and GND 706 exceeds the breakdown voltage of diode trigger chain 722, then voltage flows through diode trigger chain 722 and creates a voltage at node 724 across resistor (R) 726. Node 724 generally corresponds to the gate of Big LDMOS 708, and the voltage across resistor 726 (i.e. the gate-to-source voltage of Big LDMOS 708) causes Big LDMOS 708 to conduct current from protected pad 702 to GND 706.

As one example, the normal operating voltage at protected pad 702 may be 30V. Thus, ESD detection circuit 712 may be configured to turn on Big LDMOS in response to an overvoltage (e.g. a voltage of 35V or greater) in order to protect functional circuitry 701 from an overvoltage event. The diodes of diode trigger chain 722 may be selected such that the breakdown voltage of diode trigger chain 722 corresponds to the overvoltage at which the active clamp turns on.

Keep-off circuitry 714 includes pull-down transistor 732, capacitor 744, and resistor 748. When circuit 700 is in normal operation, Vdd may, for example, be 5V. During normal operation, keep-off control circuit 716 may turn on keep-off circuit 714. When keep-off circuit 714 is "on," keep-off circuitry 714 turns the active clamp of circuit 700 "off." Keep-off circuit 714 turns the active clamp of circuit 700 off by dropping the gate voltage of Big LDMOS 708 to ground, such that the gate-to-source voltage of Big LDMOS 708 is approximately 0V, and Big LDMOS 708 is "off," meaning there is no drain-to-source current through Big LDMOS 708. When keep-off circuitry 714 is "on," and Big LDMOS 708 is "off," then Big LDMOS 708 may not have a drain-to-source current even if the voltage between protected pad 702 and GND 706 is greater than the overvoltage. In other words, even if ESD detection circuit 712 detects an overvoltage value, then Big LDMOS 708 still may not turn on. When circuit 700 is not powered on and Vdd is 0V, then an overvoltage (e.g. 35V) may cause Big LDMOS 708 to direct current from protected pad 702 to ground, but when circuit 700 is in normal operation and Vdd is 5V, then the overvoltage of 35V may not cause Big LDMOS 708 to direct current from protected pad 702 to ground and away from functional circuit 701. The 35V across protected pad 702 and GND 706 may not be an ESD event, and thus, Big LDMOS 708 turning on may result in a current drain that causes functional circuitry 701 to malfunction.

A drain of pull-down transistor 732 is connected to a gate of Big LDMOS 708 at node 724. When pull-down transistor 732 is on, then a drain-to-source current of pull-down transistor 732 flows from node 724, through pull-down transistor 732, to GND 706. Thus, when pull-down transistor 732 is on, the voltage at node 724 is brought down to ground, meaning the gate-to-source voltage of Big LDMOS 708 is approximately zero. A gate-to-source voltage of approximately 0V disables the active clamp of circuit 700, meaning Big LDMOS 708 does not conduct a drain-to-source current even when ESD detection circuitry 712 detects an ESD event. When pull-down transistor 732 is off, then the gate voltage of Big LDMOS 708 is not pulled down to ground by pull-down transistor 732 and the active clamp is enabled. In this case, the active clamp being enabled means that Big LDMOS 708 will turn on in response to ESD detection circuit 712 detecting an ESD event. The active clamp of circuit 700 can be enabled and disabled by turning pull-down transistor 732 off and on, respectively. As will be described in greater detail below, pull-down transistor 732 can be turned on an off based on a gate control signal received from keep-off-control circuit 716.

During normal operation mode, Big LDMOS 708 may still turn on in some instances based on ESD events detected by ESD detection circuit 712. To determine when to turn Big LDMOS 708 on and when to keep Big LDMOS 708 off, ESD detection circuitry 712 may be configured to distinguish between an ESD event and other switching events based on a combination of the frequency and amplitude of the events. In response to an event with ESD-like frequency and amplitude, keep-off control circuit 716 may turn keep-off circuit 714 off. When keep-off circuit 714 is off, then Big LDMOS 708 may turn on in response to ESD detection 712 detecting an ESD event.

Keep-off control circuit 716 includes pull-down transistor 742. A drain of pull-down transistor 742 is connected to a gate of pull-down transistor 732. When pull-down transistor 742 is on, then a drain-to-source current of pull-down transistor 742 flows from node 754, through pull-down transistor 742, to GND 706. Thus, when pull-down transistor 742 is on, the voltage at node 754 is brought down to ground, meaning the gate-to-source voltage of pull-down transistor 732 is approximately zero. A gate-to-source voltage of approximately 0V turns off pull-down transistor 732, meaning pull-down transistor 732 does not conduct a drain-to-source current. When pull-down transistor 742 is off, then the gate voltage of pull-down transistor 732 is not pulled down to ground, and pull-down transistor 732 conducts current from drain to source if turned on by node 704, i.e. if the chip is powered.

In circuit 700, turning pull-down transistor 742 on causes pull-down transistor 732 to be turned off, and turning pull-down transistor 732 off, causes the active clamp to be enabled. Turning pull-down transistor 742 off, causes pull-down transistor 732 to be turned on, and turning pull-down transistor 732 on causes the active clamp to be disabled. This behavior is summarized in Table 1 below for the case that the chip is powered on, meaning the voltage at node 704 is higher than threshold level of pull-down transistor 732. In this manner, the behavior of pull-down transistor 742 and pull-down transistor 732 is the same as that of pull-down transistor 642 and pull-down transistor 632, summarized above in TABLE 1.

ESD detection circuitry 712 generally operates in the same manner as ESD detection circuitry 612 described above, but ESD detection circuitry 712 includes fewer components than ESD detection circuitry 612 and does not include components similar to the components diode trigger chain 646, resistor 650, or capacitor 652. Some of the components of ESD detection circuitry 712 shown in FIG. 7 may be actual electrical components or in some examples, may be parasitic characteristics of actual electrical components.

Figure 8:
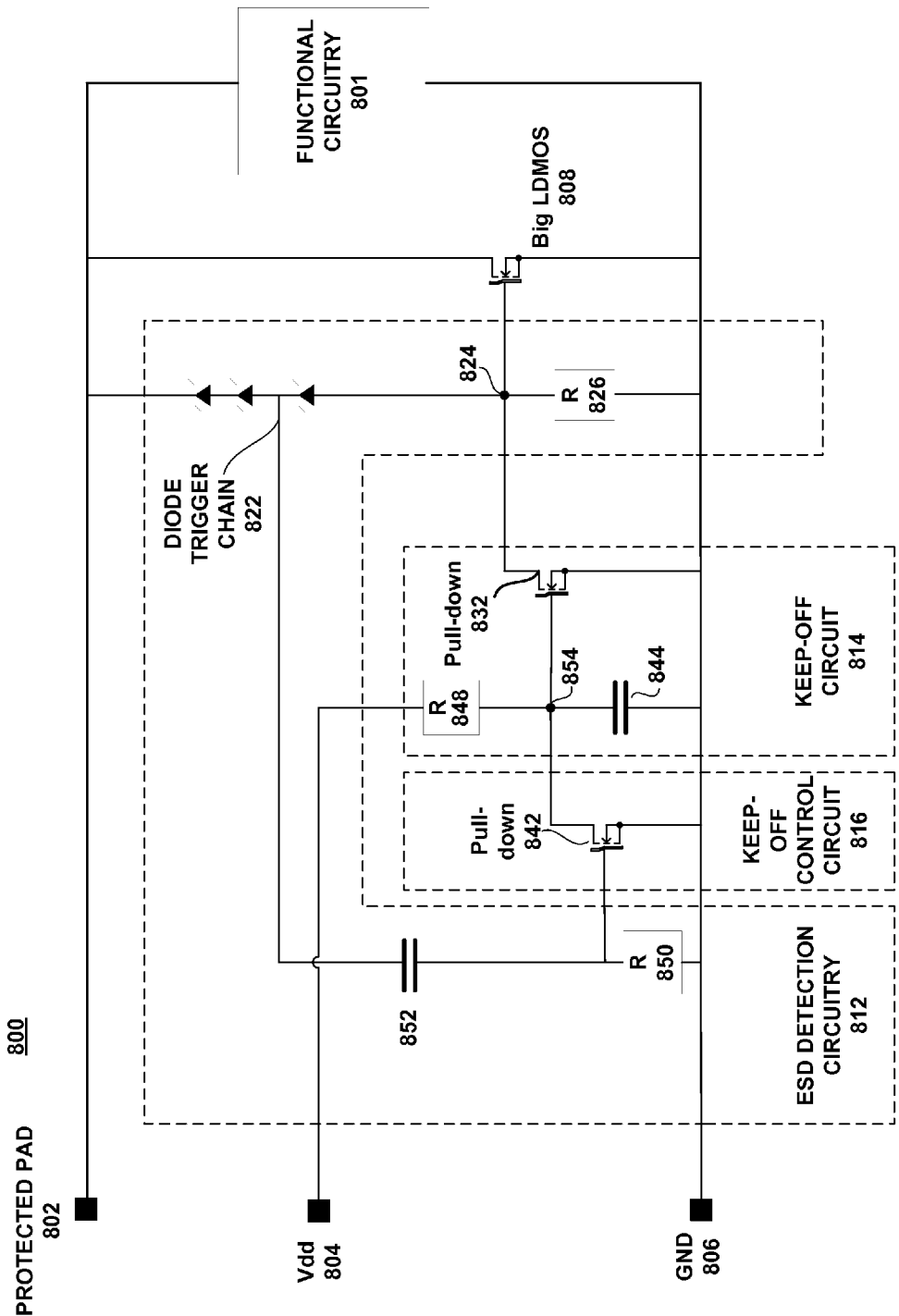
FIG. 8 shows an example of active clamp circuitry according to the techniques of this disclosure.

FIG. 8 shows an example of active clamp circuitry according to the techniques of this disclosure. Circuit 800 includes functional circuitry 801, protected pad 802, VDD input 804, and ground (GND) 806, and big LDMOS 808. Circuit 800 also includes ESD detection circuitry 812, keep-off circuitry 814, and keep-off control circuitry 816. In Circuit 800, keep-off circuitry 814 and keep-off control circuitry 816 generally operate in the same manner described above in relation to keep-off circuitry 614 and keep-off control circuitry 616 of circuit 600, but circuit 800 implements an alternate configuration for its ESD detection circuitry. The active clamp of circuit 800 may, for example, protect functional circuitry 801 from an ESD event that occurs between protected pad 802 and GND 806. Protected pad 802 represents an input to functional circuitry 801. ESD detection circuitry 812, keep-off circuitry 814, and keep-off control circuitry 816 generally operate in the same manner as ESD detection circuitry 512, keep-off circuitry 514, and keep-off control circuitry 516 of FIG. 5, but FIG. 8 shows more detail and will be described in more detail.

Input Vdd 804 represents a supply line input for keep-off circuit 814. Thus, if circuit 800 is either uninstalled or in a power off state, then Vdd is equal to 0V, and as will be explained in more detail later, keep-off circuitry 814 does not function. When circuit 800 is in a power off state and ESD detection circuitry 812 detects an ESD event across protected pad 802 and GND 806, then ESD detection circuitry 812 turns on Big LDMOS 808 and current is directed from protected pad 802 through Big LDMOS 808 to ground rather than through functional circuitry 801 which may potentially be damaged by the ESD event.

ESD detection circuitry 812 includes diode trigger chain 822, resistor 826, resistor 850, and capacitor 852. When circuit 800 is not installed or powered down (i.e. Vdd=0V), ESD detection circuitry 812 may detect an ESD event at protected pad 802 when the voltage across protected pad 802 and GND 806 exceeds the breakdown voltage of diode trigger chain 822. When the voltage between protected pad 802 and GND 806 is below the breakdown voltage of diode trigger chain 822, then no current flows through diode trigger chain 822. When the voltage between protected pad 802 and GND 806 exceeds the breakdown voltage of diode trigger chain 822, then voltage flows through diode trigger chain 822 and creates a voltage at node 824 across resistor (R) 826. Node 824 generally corresponds to the gate of Big LDMOS 808, and the voltage across resistor 826 (i.e. the gate-to-source voltage of Big LDMOS 808) causes Big LDMOS 808 to conduct current from protected pad 802 to GND 806.

As one example, the normal operating voltage at protected pad 802 may be 30V. Thus, ESD detection circuit 812 may be configured to turn on Big LDMOS in response to an overvoltage (e.g. a voltage of 35V or greater) in order to protect functional circuitry 801 from an overvoltage event. The diodes of diode trigger chain 822 may be selected such that the breakdown voltage of diode trigger chain 822 corresponds to the overvoltage at which the active clamp turns on.

Keep-off circuitry 814 includes pull-down transistor 832, capacitor 844, and resistor 848. When circuit 800 is in normal operation, Vdd may, for example, be 5V. During normal operation, keep-off control circuit 816 may turn on keep-off circuit 814. When keep-off circuit 814 is "on," keep-off circuitry 814 turns the active clamp of circuit 800 "off." Keep-off circuit 814 turns the active clamp of circuit 800 off by dropping the gate voltage of Big LDMOS 808 to ground, such that the gate-to-source voltage of Big LDMOS 808 is approximately 0V, and Big LDMOS 808 is "off," meaning there is no drain-to-source current through Big LDMOS 808. When keep-off circuitry 814 is "on," and Big LDMOS 808 is "off," then Big LDMOS 808 may not have a drain-to-source current even if the voltage between protected pad 802 and GND 806 is greater than the overvoltage. In other words, even if ESD detection circuit 812 detects an overvoltage value, then Big LDMOS 808 still may not turn on. When circuit 800 is not powered on and Vdd is 0V, then an overvoltage (e.g. 35V) may cause Big LDMOS 808 to direct current from protected pad 802 to ground, but when circuit 800 is in normal operation and Vdd is 5V, then the overvoltage of 35V may not cause Big LDMOS 808 to direct current from protected pad 802 to ground and away from functional circuit 801. The 35V across protected pad 802 and GND 806 may not be an ESD event, and thus, Big LDMOS 808 turning on may result in a current drain that causes functional circuitry 801 to malfunction.

A drain of pull-down transistor 832 is connected to a gate of Big LDMOS 808 at node 824. When pull-down transistor 832 is on, then a drain-to-source current of pull-down transistor 832 flows from node 824, through pull-down transistor 832, to GND 806. Thus, when pull-down transistor 832 is on, the voltage at node 824 is brought down to ground, meaning the gate-to-source voltage of Big LDMOS 808 is approximately zero. A gate-to-source voltage of approximately 0V disables the active clamp of circuit 800, meaning Big LDMOS 808 does not conduct a drain-to-source current even when ESD detection circuitry 812 detects an ESD event. When pull-down transistor 832 is off, then the gate voltage of Big LDMOS 808 is not pulled down to ground by pull-down transistor 832 and the active clamp is enabled. In this case, the active clamp being enabled means that Big LDMOS 808 will turn on in response to ESD detection circuit 812 detecting an ESD event. The active clamp of circuit 800 can be enabled and disabled by turning pull-down transistor 832 off and on, respectively. As will be described in greater detail below, pull-down transistor 832 can be turned on an off based on a gate control signal received from keep-off-control circuit 816.

During normal operation mode, Big LDMOS 808 may still turn on in some instances based on ESD events detected by ESD detection circuit 812. To determine when to turn Big LDMOS 808 on and when to keep Big LDMOS 808 off, ESD detection circuitry 812 may be configured to distinguish between an ESD event and other switching events based on a combination of the frequency and amplitude of the events. In response to an event with ESD-like frequency and amplitude, keep-off control circuit 816 may turn keep-off circuit 814 off. When keep-off circuit 814 is off, then Big LDMOS 808 may turn on in response to ESD detection 812 detecting an ESD event.

Keep-off control circuit 816 includes pull-down transistor 842. A drain of pull-down transistor 842 is connected to a gate of pull-down transistor 832. When pull-down transistor 842 is on, then a drain-to-source current of pull-down transistor 842 flows from node 854, through pull-down transistor 842, to GND 806. Thus, when pull-down transistor 842 is on, the voltage at node 854 is brought down to ground, meaning the gate-to-source voltage of pull-down transistor 832 is approximately zero. A gate-to-source voltage of approximately 0V turns off pull-down transistor 832, meaning pull-down transistor 832 does not conduct a drain-to-source current. When pull-down transistor 842 is off, then the gate voltage of pull-down transistor 832 is not pulled down to ground, and pull-down transistor 832 conducts current from drain to source if turned on by node 804, i.e. if the chip is powered.

In circuit 800, turning pull-down transistor 842 on causes pull-down transistor 832 to be turned off, and turning pull-down transistor 832 off, causes the active clamp to be enabled. Turning pull-down transistor 842 off, causes pull-down transistor 832 to be turned on, and turning pull-down transistor 832 on causes the active clamp to be disabled. This behavior is summarized in Table 1 below for the case that the chip is powered on, meaning the voltage at node 804 is higher than threshold level of pull-down transistor 832. In this manner, the behavior of pull-down transistor 842 and pull-down transistor 832 is the same as that of pull-down transistor 642 and pull-down transistor 632, summarized above in TABLE 1.

ESD detection circuitry 812 generally operates in the same manner as ESD detection circuitry 612 described above, but ESD detection circuitry 812 does not include a second diode trigger chain component such as diode trigger chain 646.

Figure 9:
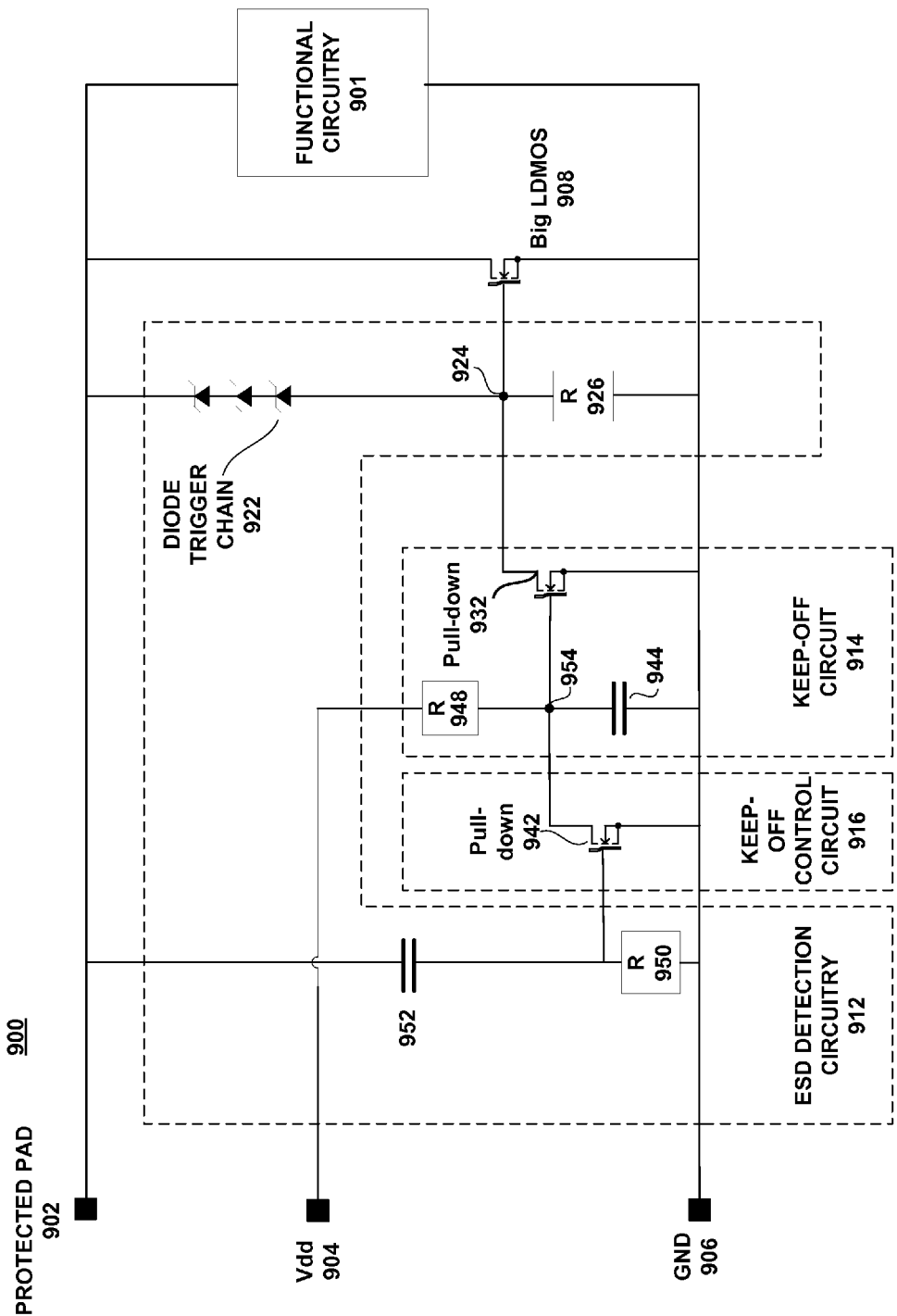
FIG. 9 shows an example of active clamp circuitry according to the techniques of this disclosure.

FIG. 9 shows an example of active clamp circuitry according to the techniques of this disclosure. Circuit 900 includes functional circuitry 901, protected pad 902, VDD input 904, and ground (GND) 906, and big LDMOS 908. Circuit 900 also includes ESD detection circuitry 912, keep-off circuitry 914, and keep-off control circuitry 916. In Circuit 900, keep-off circuitry 914 and keep-off control circuitry 916 generally operate in the same manner described above in relation to keep-off circuitry 614 and keep-off control circuitry 616 of circuit 600, but circuit 900 implements an alternate configuration for its ESD detection circuitry. The active clamp of circuit 900 may, for example, protect functional circuitry 901 from an ESD event that occurs between protected pad 902 and GND 906. Protected pad 902 represents an input to functional circuitry 901. ESD detection circuitry 912, keep-off circuitry 914, and keep-off control circuitry 916 generally operate in the same manner as ESD detection circuitry 512, keep-off circuitry 514, and keep-off control circuitry 516 of FIG. 5, but FIG. 9 shows more detail and will be described in more detail.

Input Vdd 904 represents a supply line input for keep-off circuit 914. Thus, if circuit 900 is either uninstalled or in a power off state, then Vdd is equal to 0V, and as will be explained in more detail later, keep-off circuitry 914 is off. When circuit 900 is in a power off state and ESD detection circuitry 912 detects an ESD event across protected pad 902 and GND 906, then ESD detection circuitry 912 turns on Big LDMOS 908 and current is directed from protected pad 902 through Big LDMOS 908 to ground rather than through functional circuitry 901 which may potentially be damaged by the ESD event.

ESD detection circuitry 912 includes diode trigger chain 922, resistor 926, resistor 950, and capacitor 952. When circuit 900 is powered down (i.e. Vdd=0V), ESD detection circuitry 912 may detect an ESD event at protected pad 902 when the voltage across protected pad 902 and GND 906 exceeds the breakdown voltage of diode trigger chain 922. When the voltage between protected pad 902 and GND 906 is below the breakdown voltage of diode trigger chain 922, then no current flows through diode trigger chain 922. When the voltage between protected pad 902 and GND 906 exceeds the breakdown voltage of diode trigger chain 922, then voltage flows through diode trigger chain 922 and creates a voltage at node 924 across resistor (R) 926. Node 924 generally corresponds to the gate of Big LDMOS 908, and the voltage across resistor 926 (i.e. the gate-to-source voltage of Big LDMOS 908) causes Big LDMOS 908 to conduct current from protected pad 902 to GND 906.

As one example, the normal operating voltage at protected pad 902 may be 30V. Thus, ESD detection circuit 912 may be configured to turn on Big LDMOS in response to an overvoltage (e.g. a voltage of 35V or greater) in order to protect functional circuitry 901 from an overvoltage event. The diodes of diode trigger chain 922 may be selected such that the breakdown voltage of diode trigger chain 922 corresponds to the overvoltage at which the active clamp turns on.

Keep-off circuitry 914 includes pull-down transistor 932, capacitor 944, and resistor 948. When circuit 900 is in normal operation, Vdd may, for example, be 5V. During normal operation, keep-off control circuit 916 may turn on keep-off circuit 914. When keep-off circuit 914 is "on," keep-off circuitry 914 turns the active clamp of circuit 900 "off." Keep-off circuit 914 turns the active clamp of circuit 900 off by dropping the gate voltage of Big LDMOS 908 to ground, such that the gate-to-source voltage of Big LDMOS 908 is approximately 0V, and Big LDMOS 908 is "off," meaning there is no drain-to-source current through Big LDMOS 908. When keep-off circuitry 914 is "on," and Big LDMOS 908 is "off," then Big LDMOS 908 may not have a drain-to-source current even if the voltage between protected pad 902 and GND 906 is greater than the overvoltage. In other words, even if ESD detection circuit 912 detects an overvoltage value, then Big LDMOS 908 still may not turn on. When circuit 900 is not powered on and Vdd is 0V, then an overvoltage (e.g. 35V) may cause Big LDMOS 908 to direct current from protected pad 902 to ground, but when circuit 900 is in normal operation and Vdd is 5V, then the overvoltage of 35V may not cause Big LDMOS 908 to direct current from protected pad 902 to ground and away from functional circuit 901. The 35V across protected pad 902 and GND 906 may not be an ESD event, and thus, Big LDMOS 908 turning on may result in a current drain that causes functional circuitry 901 to malfunction.

A drain of pull-down transistor 932 is connected to a gate of Big LDMOS 908 at node 924. When pull-down transistor 932 is on, then a drain-to-source current of pull-down transistor 932 flows from node 924, through pull-down transistor 932, to GND 906. Thus, when pull-down transistor 932 is on, the voltage at node 924 is brought down to ground, meaning the gate-to-source voltage of Big LDMOS 908 is approximately zero. A gate-to-source voltage of approximately 0V disables the active clamp of circuit 900, meaning Big LDMOS 908 does not conduct a drain-to-source current even when ESD detection circuitry 912 detects an ESD event. When pull-down transistor 932 is off, then the gate voltage of Big LDMOS 908 is not pulled down to ground by pull-down transistor 932 and the active clamp is enabled. In this case, the active clamp being enabled means that Big LDMOS 908 will turn on in response to ESD detection circuit 912 detecting an ESD event. The active clamp of circuit 900 can be enabled and disabled by turning pull-down transistor 932 off and on, respectively. As will be described in greater detail below, pull-down transistor 932 can be turned on an off based on a gate control signal received from keep-off-control circuit 916.

During normal operation mode, Big LDMOS 908 may still turn on in some instances based on ESD events detected by ESD detection circuit 912. To determine when to turn Big LDMOS 908 on and when to keep Big LDMOS 908 off, ESD detection circuitry 912 may be configured to distinguish between an ESD event and other switching events based on a combination of the frequency and amplitude of the events. In response to an event with ESD-like frequency and amplitude, keep-off control circuit 916 may turn keep-off circuit 914 off. When keep-off circuit 914 is off, then Big LDMOS 908 may turn on in response to ESD detection 912 detecting an ESD event.

Keep-off control circuit 916 includes pull-down transistor 942. A drain of pull-down transistor 942 is connected to a gate of pull-down transistor 932. When pull-down transistor 942 is on, then a drain-to-source current of pull-down transistor 942 flows from node 954, through pull-down transistor 942, to GND 906. Thus, when pull-down transistor 942 is on, the voltage at node 954 is brought down to ground, meaning the gate-to-source voltage of pull-down transistor 932 is approximately zero. A gate-to-source voltage of approximately 0V turns off pull-down transistor 932, meaning pull-down transistor 932 does not conduct a drain-to-source current. When pull-down transistor 942 is off, then the gate voltage of pull-down transistor 932 is not pulled down to ground, and pull-down transistor 932 conducts current from drain to source if turned on by node 904, i.e. if the chip is powered.

In circuit 900, turning pull-down transistor 942 on causes pull-down transistor 932 to be turned off, and turning pull-down transistor 932 off, causes the active clamp to be enabled. Turning pull-down transistor 942 off, causes pull-down transistor 932 to be turned on, and turning pull-down transistor 932 on causes the active clamp to be disabled. This behavior is summarized in Table 1 below for the case that the chip is powered on, meaning the voltage at node 904 is higher than threshold level of pull-down transistor 932. In this manner, the behavior of pull-down transistor 942 and pull-down transistor 932 is the same as that of pull-down transistor 642 and pull-down transistor 632, summarized above in TABLE 1.

ESD detection circuitry 912 generally operates in the same manner as ESD detection circuitry 612 described above, but ESD detection circuitry 912 does not include a second diode trigger chain component such as diode trigger chain 646.

Figure 10:
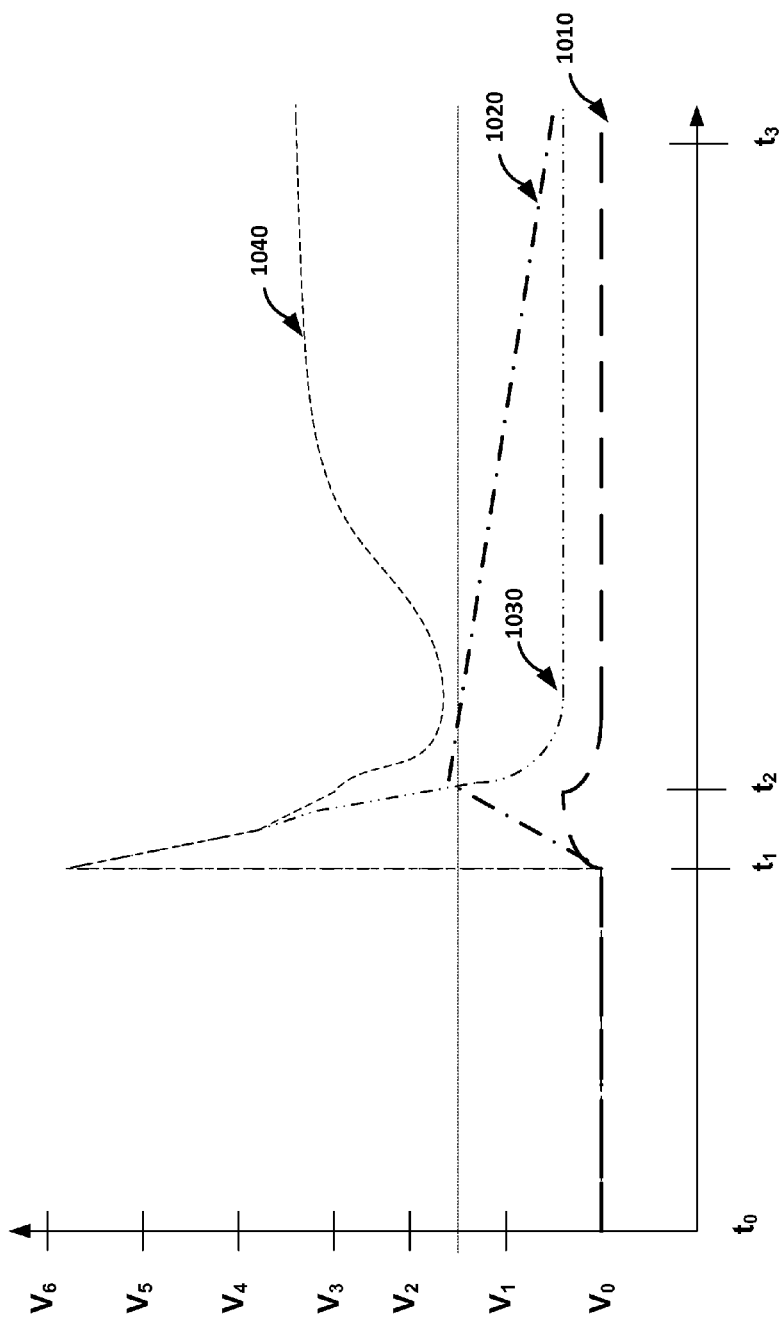
FIG. 10 is a voltage-time diagram illustrating transient response characteristics of the example active clamp circuitry shown in FIG. 6.

FIG. 10 is a voltage-time diagram illustrating transient response characteristics of the example active clamp circuitry shown in FIG. 6. FIG. 10 shows plots 1010-1040 which represent a voltage measurement taken between times t0 and t3 at node 624 (e.g., the gate of Big LDMOS 608). FIG. 10 is described below within the context of the components of circuit 600 of FIG. 6. Voltage V0 approximately corresponds to zero volts. A voltage above V1 (typically equal to the threshold voltage (Vth) of Big LDMOS 608 will turn on the Big LDMOS 608, thus enabling a current flow through Big LDMOS 608.

Plots 1010 and 1020 of FIG. 10 shows a voltage at node 624 during an EMC event (e.g., from 24V to 30V within 1 ns) between time t1 and t2. Plot 1010 shows that when circuit 600 is powered up (e.g. VDD is 5V, afterwards called "on-mode") that the voltage at node 624 during a switching event is lower than the voltage at node 624 in plot 1020 when circuit 600 is unpowered (e.g. VDD is 0V, afterwards called "off-mode") In addition, plot 1010 also shows that when circuit 600 is in the "on-mode" that the voltage at node 624 is greater than zero for a much shorter amount of time than the voltage at node 624 in plot 1020 when circuit 600 is in the "off-mode."

Plots 1030 and 1040 of FIG. 10 shows a voltage at node 624 during an ESD event (e.g., from 24V to 80V within 100 ps). Plot 1030 shows that when circuit 600 does not include keep-off-control circuit 616 and circuit 600 operates in the "on-mode" the voltage at node 624 decays rapidly to nearly 0V and current associated with the ESD event will not conduct through Big LDMOS 608. Plot 1040 shows that when circuit 600 does include keep-off-control circuit 616 and circuit 600 may operate in the "on-mode" even during an ESD event the voltage at node 624 does stay above V1 and current associated with the ESD event will conduct through Big LDMOS 608.

Figure 11:
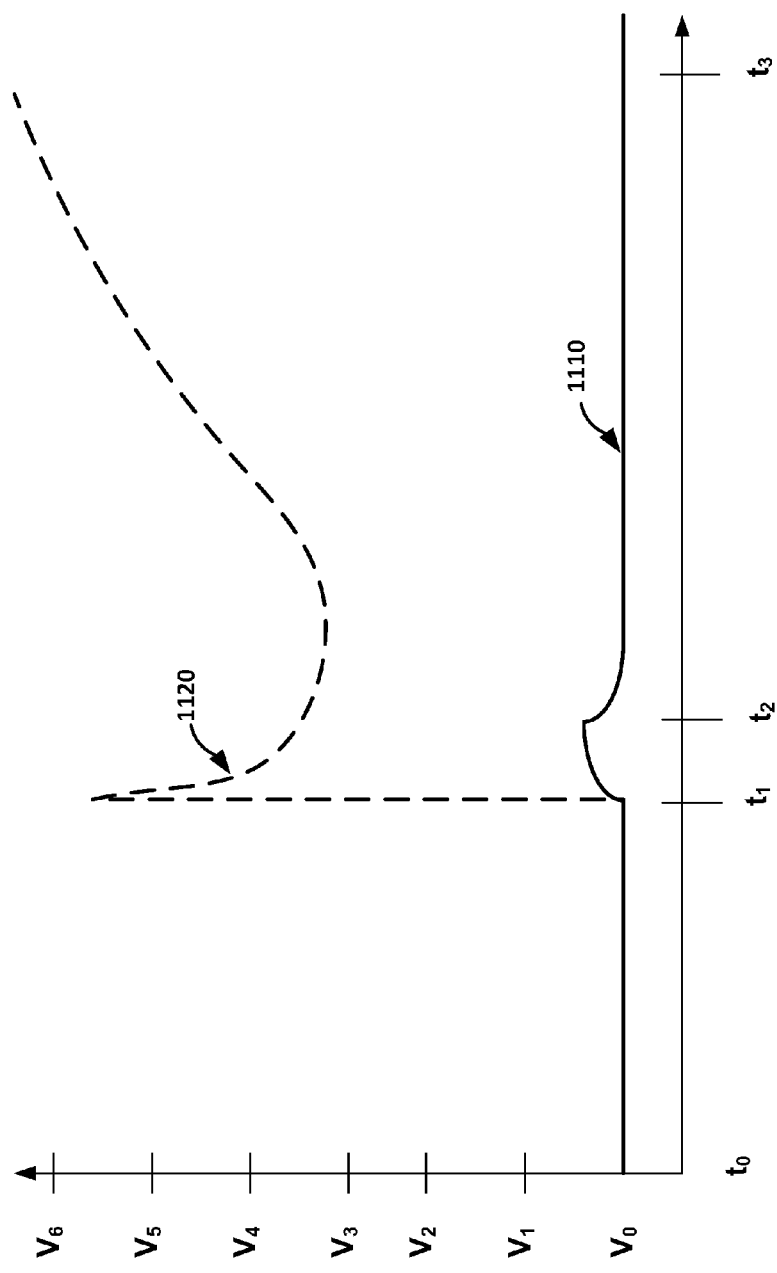
FIG. 11 is a voltage-time diagram illustrating transient response characteristics of the example active clamp circuitry shown in FIG. 7.

FIG. 11 is a voltage-time diagram illustrating transient response characteristics of the example active clamp circuitry shown in FIG. 7. FIG. 11 shows plots 1110 and 1120 which represent a voltage measurement taken between times t0 and t3 at node 724 (e.g., the gate of Big LDMOS 708). FIG. 11 is described below within the context of the components of circuit 700 of FIG. 7.

Plots 1110 and 1120 of FIG. 11 shows a voltage at node 724 during an EMC event (e.g., from 24V to 30V) and an ESD event (e.g., from 24V to 80V), respectively (e.g., with a rise time of y 1 ns and 100 ps, respectively). Similar to plots 1010 and 1030 of FIG. 10, a fast rising and high amplitude EMC or ESD event at node 724 will be charged up by a parasitic drain-gate capacitance of Big LDMOS 708 and the breakdown of diode trigger chain 722. The first effect depends on the rise time, the second on the amplitude of the event. This charging of node 724 may activate pull-down transistor 742 and consequently switch off pull-down transistor 732.

Figure 12:
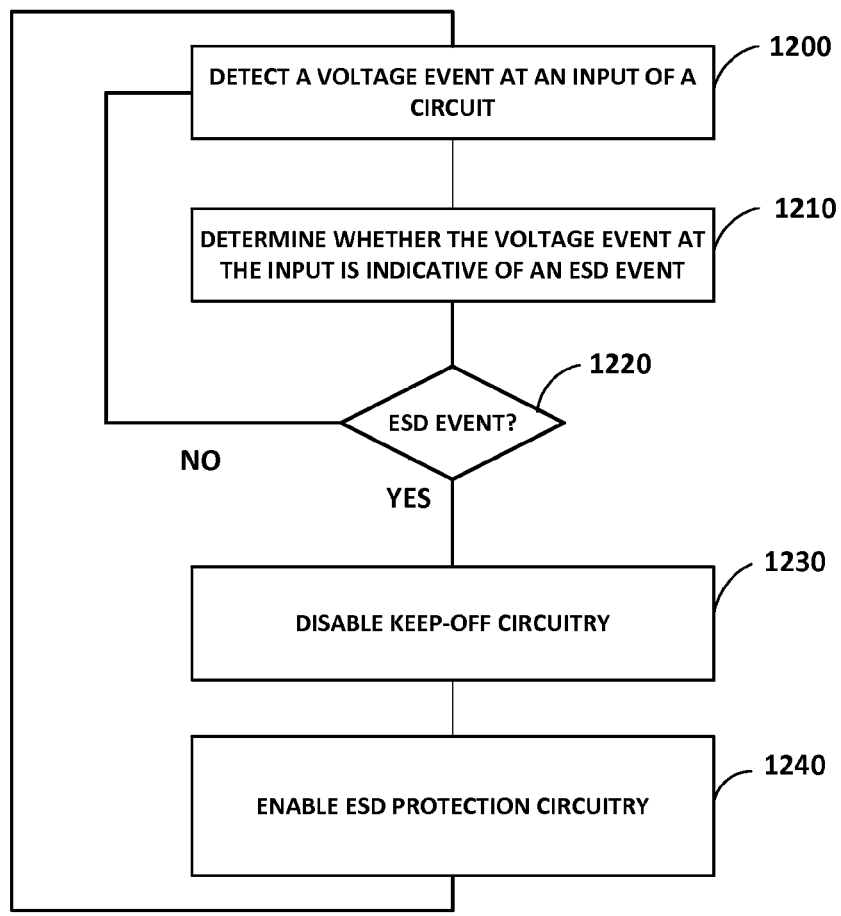
FIG. 12 is a flow chart illustrating example operations of an example of active clamp circuitry according to the techniques of this disclosure.

FIG. 12 is a flow chart illustrating example operations of an example of an ESD protection circuitry according to the techniques of this disclosure. FIG. 12 is described below within the context of circuit 500 of FIG. 5.

FIG. 12 shows that ESD detection circuitry (e.g., ESD detection circuit 512 of circuit 500) may detect a voltage event at an input (e.g., protected pad 502) of the circuit (1200). For example, during normal operation (e.g., when power is applied to Vdd 504), an ESD event (e.g., an overvoltage or voltage spike) may be sensed by ESD detection circuit 512.

FIG. 12 illustrates that ESD detection circuitry of circuit 500 may determine whether the voltage event at the input is indicative of an ESD event. For example, ESD detection circuit 512 may compare the voltage associated with the voltage event at the input (e.g., an overvoltage or voltage spike) to a voltage threshold and a frequency threshold to determine whether the amplitude and frequency associated with the voltage event is indicative of an actual ESD event that may damage circuit 500 and is not indicative of a non-ESD event (e.g., noise) that might be inherent in the overall system in which circuit 500 is installed.

FIG. 12 shows that responsive to determining that the voltage event is indicative of an ESD event (1220), that ESD detection circuitry of circuit 500 may disable keep-off circuitry of circuit 500 (1230) and may enable ESD protection circuitry of circuit 500 (1240). For example, after determining that the voltage event (e.g., the overvoltage or voltage spike) at protected pad 502 may be an ESD event, ESD detection circuit 512 may relay information to keep-off control circuit 516 that causes keep-off control circuit 516 to disable keep-off circuit 514 by turning-off or disabling a pulldown transistor or switch associated with keep-off control circuit 514. The ESD detection circuit 512 may further turn-on or enable bid LDMOS 508, thereby enabling the ESD protection circuitry of circuit 500.

In some examples, the ESD detection circuitry of circuit 500 may determine whether the voltage event is indicative of an ESD event by at least determining whether the voltage event is indicative of an ESD event while the circuit is operating in a powered on state. In other words, ESD detection circuit 512, keep-off control circuit 516, keep-off circuit 514, and big LDMOS 508 may perform ESD protection techniques for protecting circuit 500 against ESD events, even when power is applied to functional circuitry 501 and circuit 500 is operating in a powered on state.

In some examples the ESD protection circuitry of circuit 500 is enabled when circuit 500 is operating in a powered off state. In other words, when no power is applied to Vdd 504, and functional circuitry 501 is in an unpowered or not powered state, big LDMOS 508 may continue to provide ESD protection capability.

In some examples, responsive to determining that the voltage event is not indicative of an ESD event, the ESD detection circuitry of the circuit may enable the keep-off circuit by means of keep-off-control circuitry and disable the ESD protection circuit. In other words, after ESD detection circuit 512, determines that a voltage event (e.g., an overvoltage or voltage spike) represents a non-ESD event, ESD detection circuit 512 may relay information to keep-off control circuit 516 that causes keep-off control circuit 516 to enable keep-off circuit 514 and prevent circuit 500 from interference with noise or other non-ESD type events.

In some examples, ESD detection circuit 512 and keep-off control circuit 516 (e.g., the ESD detection circuitry of circuit 500) may determine whether the voltage event is indicative of an ESD event by at least one of determining whether the voltage exceeds a breakdown voltage associated with a diode trigger chain of the ESD detection circuitry, or determining whether the voltage satisfies a frequency threshold. In other words, ESD detection circuit 512 may include a diode trigger chain that has a breakdown voltage associated with an ESD event. ESD detection circuit 512 may further include actual capacitor and/or resistor elements, and/or have an inherent parasitic capacitance and resistance, such that ESD detection circuit 512 may have a time constant (e.g., R×C) associated with ESD detection circuit 512. If a potential ESD event has a frequency corresponding to the time constant of ESD detection circuit 512 in addition to having an amplitude that exceeds a breakdown voltage of a diode trigger chain, then ESD detection circuit 512 may determine that a detected voltage event (e.g., an overvoltage or voltage spike) represents an ESD event and not a non-ESD event.

Clause 1. A circuit comprising: electrostatic discharge (ESD) protection circuitry; keep-off circuitry; and ESD detection circuitry configured to enable the ESD protection circuitry and disable the keep-off circuitry when the ESD detection circuitry detects an ESD event.

Clause 2. The circuit of clause 1, further comprising keep-off-control circuitry, wherein the ESD detection circuitry is configured to disable the keep-off circuitry by means of the keep-off-control circuitry when the ESD detection circuitry detects the ESD event.

Clause 3. The circuit of clause 2, wherein the ESD detection circuitry is further configured to enable the ESD protection circuitry and disable the keep-off circuitry by means of the keep-off-control circuitry when the ESD detection circuitry detects an ESD event and when the circuit is operating in a powered on state.

Clause 4. The circuit of any of clauses 2-3, wherein the ESD detection circuitry is further configured to disable the ESD protection circuitry and enable the keep-off circuitry by means of the keep-off-control circuitry when the ESD detection circuitry does not detect the ESD event.

Clause 5. The circuit of clause 4, wherein the ESD detection circuitry is further configured to disable the ESD protection circuitry and enable the keep-off circuitry by means of the keep-off-control circuitry when the ESD detection circuitry does not detect the ESD event and the circuit is operating in a powered on state.

Clause 6. The circuit of any of clauses 2-5, wherein the keep-off-control circuitry comprises a switch, and wherein the ESD detection circuitry is configured not to enable the ESD protection circuitry by means of the keep-off-control circuitry by controlling the switch when the keep-off circuitry is enabled.

Clause 7. The circuit of any of clauses 2-6, wherein the keep-off-control circuitry comprises a switch, and wherein the ESD detection circuitry is configured to enable the ESD protection circuitry by means of the keep-off-control circuitry by controlling the switch to disable the keep-off circuitry.

Clause 8. The circuit of any of clauses 1-7, wherein the ESD detection circuitry is configured to detect the ESD event when the ESD detection circuitry determines that a voltage at an input of the circuit satisfies at least one voltage level threshold criterion or at least one frequency threshold criterion.

Clause 9. The circuit of any of clauses 1-8, wherein the ESD detection circuitry is configured to detect a non-ESD event and not detect the ESD event when the ESD detection circuitry detects a voltage at an input of the circuit that does not satisfy at least one voltage level threshold criterion or at least one frequency threshold criterion.

Clause 10. The circuit of any of clauses 1-9, wherein the ESD detection circuitry comprises a diode trigger chain for enabling the ESD protection circuitry.

Clause 11. The circuit of clause 10, wherein the ESD detection circuitry is configured to detect the ESD event and enable the ESD protection circuitry when a voltage across the diode trigger chain exceeds a breakdown voltage associated with the diode trigger chain and satisfies a frequency threshold based on a time constant associated with the ESD detection circuitry.

Clause 12. The circuit of clause 11, wherein the ESD detection circuitry comprises at least one capacitor and at least one resistor and the time constant associated with the ESD detection circuitry is based on the at least one capacitor and the at least one resistor.

Clause 13. The circuit of any of clauses 11-12, wherein the time constant associated with the ESD detection circuitry is based on a parasitic capacitance associated with one or more elements of the ESD detection circuitry.

Clause 14. A method comprising: detecting, by an electrostatic discharge (ESD) detection circuitry of a circuit, a voltage event at an input of the circuit; determining, by the ESD detection circuitry, whether the voltage event at the input is indicative of an ESD event; and responsive to determining that the voltage event is indicative of an ESD event: disabling, by the ESD detection circuitry of the circuit, keep-off circuitry of the circuit; and enabling, by the ESD detection circuitry of the circuit and by means of keep-off-control circuitry of the circuit, ESD protection circuitry of the circuit.

Clause 15. The method of clause 14, wherein determining whether the voltage event is indicative of an ESD event comprises determining, by the ESD detection circuitry of the circuit, whether the voltage event is indicative of an ESD event while the circuit is operating in a powered on state.

Clause 16. The method of any of causes 14-15, wherein the ESD protection circuitry of the circuit is enabled when the circuit is operating in a powered off state.

Clause 17. The method of any of causes 14-16, further comprising: responsive to determining that the voltage event is not indicative of an ESD event: enabling, by the ESD detection circuitry of the circuit and by means of keep-off-control circuitry, the keep-off circuit; and disabling, by the ESD detection circuitry of the circuit, the ESD protection circuit.

Clause 18. The method of any of causes 14-17, wherein determining whether the voltage event is indicative of an ESD event comprises at least one of determining, by the ESD detection circuitry of the circuit, whether a voltage level associated with the voltage event exceeds a breakdown voltage associated with a diode trigger chain of the ESD detection circuitry, or determining, by the ESD detection circuitry of the circuit, whether a frequency level associated with the voltage event satisfies a frequency threshold.

Clause 19. The method of clause 18, wherein the frequency threshold is based on a time constant associated with the ESD detection circuitry.

Clause 20. A system comprising: means for detecting a voltage event at an input of the circuit; means for determining whether the voltage event at the input is indicative of an ESD event; and means for disabling keep-off circuitry of the circuit in response to determining that the voltage event is indicative of the ESD event; and means for enabling ESD protection circuitry of the circuit in response to determining that the voltage event is indicative of the ESD event.

Various examples of techniques and circuits have been described. These and other examples are within the scope of the following claims.

The invention claimed is:

1. A circuit comprising:
electrostatic discharge (ESD) protection circuitry;
keep-off circuitry;
ESD detection circuitry configured to enable the ESD protection circuitry and disable the keep-off circuitry when the ESD detection circuitry detects an ESD event; and
keep-off-control circuitry, wherein the ESD detection circuitry is configured to disable the keep-off circuitry by means of the keep-off-control circuitry in response to the ESD detection circuitry detecting the ESD event while the circuit is operating in a powered on state.

2. The circuit of claim 1, wherein the ESD detection circuitry is further configured to disable the ESD protection circuitry and enable the keep-off circuitry by means of the keep-off-control circuitry when the ESD detection circuitry does not detect the ESD event.

3. The circuit of claim 2, wherein the ESD detection circuitry is further configured to disable the ESD protection circuitry and enable the keep-off circuitry by means of the keep-off-control circuitry when the ESD detection circuitry does not detect the ESD event and the circuit is operating in a powered on state.

4. The circuit of claim 1, wherein the keep-off-control circuitry comprises a switch, and wherein the ESD detection circuitry is configured not to enable the ESD protection circuitry by means of the keep-off-control circuitry by controlling the switch when the keep-off circuitry is enabled.

5. The circuit of claim 1, wherein the keep-off-control circuitry comprises a switch, and wherein the ESD detection circuitry is configured to enable the ESD protection circuitry by means of the keep-off-control circuitry by controlling the switch to disable the keep-off circuitry.

6. The circuit of claim 1, wherein the ESD detection circuitry is configured to detect the ESD event when the ESD detection circuitry determines that a voltage at an input of the circuit satisfies at least one voltage level threshold criterion or at least one frequency threshold criterion.

7. The circuit of claim 1, wherein the ESD detection circuitry is configured to detect a non-ESD event and not detect the ESD event when the ESD detection circuitry detects a voltage at an input of the circuit that does not satisfy at least one voltage level threshold criterion or at least one frequency threshold criterion.

8. The circuit of claim 1, wherein the ESD detection circuitry comprises a diode trigger chain for enabling the ESD protection circuitry.

9. The circuit of claim 8, wherein the ESD detection circuitry is configured to detect the ESD event and enable the ESD protection circuitry when a voltage across the diode trigger chain exceeds a breakdown voltage associated with the diode trigger chain and satisfies a frequency threshold based on a time constant associated with the ESD detection circuitry.

10. The circuit of claim 9, wherein the ESD detection circuitry comprises at least one capacitor and at least one resistor and the time constant associated with the ESD detection circuitry is based on the at least one capacitor and the at least one resistor.

11. The circuit of claim 9, wherein the time constant associated with the ESD detection circuitry is based on a parasitic capacitance associated with one or more elements of the ESD detection circuitry.

12. A method comprising:
   detecting, by electrostatic discharge (ESD) detection circuitry of a circuit, a voltage event at an input of the circuit;
   determining, by the ESD detection circuitry, whether the voltage event at the input is indicative of an ESD event; and
   responsive to determining that the voltage event is indicative of an ESD event:
      disabling, by the ESD detection circuitry of the circuit, keep-off circuitry of the circuit in response to detecting an ESD event while the circuit is operating in a powered on state; and
      enabling, by the ESD detection circuitry of the circuit and by means of keep-off-control circuitry of the circuit, ESD protection circuitry of the circuit.

13. The method of claim 12, further comprising:
   enabling the ESD protection circuitry of the circuit when the circuit is operating in a powered off state.

14. The method of claim 12, further comprising:
   responsive to determining that the voltage event is not indicative of an ESD event:
   enabling, by the ESD detection circuitry of the circuit and by means of keep-off-control circuitry, the keep-off circuit; and
   disabling, by the ESD detection circuitry of the circuit, the ESD protection circuit.

15. The method of claim 12, wherein determining whether the voltage event is indicative of an ESD event comprises at least one of determining, by the ESD detection circuitry of the circuit, whether a voltage level associated with the voltage event exceeds a breakdown voltage associated with a diode trigger chain of the ESD detection circuitry, or
   determining, by the ESD detection circuitry of the circuit, whether a frequency level associated with the voltage event satisfies a frequency threshold.

16. The method of claim 15, wherein the frequency threshold is based on a time constant associated with the ESD detection circuitry.

17. A system comprising:
   means for detecting a voltage event at an input of the circuit;
   means for determining whether the voltage event at the input is indicative of an ESD event; and
   means for disabling keep-off circuitry of the circuit in response to determining that the voltage event is indicative of the ESD event while the system is operating in a powered on state; and
   means for enabling ESD protection circuitry of the circuit in response to determining that the voltage event is indicative of the ESD event.

* * * * *